US008861558B2

(12) United States Patent
Yoshino et al.

(10) Patent No.: US 8,861,558 B2
(45) Date of Patent: Oct. 14, 2014

(54) LASER SYSTEM AND LASER LIGHT GENERATION METHOD

(75) Inventors: Masaya Yoshino, Oyama (JP); Takashi Onose, Oyama (JP); Osamu Wakabayashi, Hiratsuka (JP)

(73) Assignee: Gigaphoton, Inc., Oyama-shi, Tochigi (JP)

( * ) Notice: Subject to any disclaimer, the term of this patent is extended or adjusted under 35 U.S.C. 154(b) by 64 days.

(21) Appl. No.: 13/427,568

(22) Filed: Mar. 22, 2012

(65) Prior Publication Data

US 2012/0250710 A1 Oct. 4, 2012

(30) Foreign Application Priority Data

Mar. 28, 2011 (JP) ................. 2011-071168

(51) Int. Cl.
*H01S 3/13* (2006.01)
*H01S 3/00* (2006.01)
*H01S 3/23* (2006.01)
*H01S 3/16* (2006.01)
*H01S 3/134* (2006.01)

(52) U.S. Cl.
CPC ............ *H01S 3/2333* (2013.01); *H01S 3/1636* (2013.01); *H01S 3/2316* (2013.01); *H01S 3/134* (2013.01); *H01S 3/2325* (2013.01); *H01S 3/2366* (2013.01); *H01S 3/1305* (2013.01); *H01S 3/0092* (2013.01); *H01S 3/0057* (2013.01)
USPC .......................... 372/25; 372/29.01; 372/38.02

(58) Field of Classification Search
USPC .................................... 372/25, 29.01, 38.02
See application file for complete search history.

(56) References Cited

U.S. PATENT DOCUMENTS

| 5,689,363 | A | 11/1997 | Dane et al. |
| 6,816,520 | B1 | 11/2004 | Tulloch et al. |
| 7,564,879 | B2 | 7/2009 | Tanaka et al. |
| 7,593,437 | B2 | 9/2009 | Staroudoumov et al. |
| 7,593,440 | B2 | 9/2009 | Spinelli et al. |
| 2005/0018723 | A1 | 1/2005 | Morita et al. |
| 2006/0251135 | A1* | 11/2006 | Ershov et al. ............. 372/25 |
| 2008/0285602 | A1* | 11/2008 | Nagai et al. .............. 372/20 |
| 2009/0067468 | A1 | 3/2009 | Brown et al. |

FOREIGN PATENT DOCUMENTS

| JP | 09-214023 | 8/1997 |
| JP | 11-046025 | 2/1999 |
| JP | 2000-156535 | 6/2000 |
| JP | 2008-122785 | 5/2008 |

* cited by examiner

*Primary Examiner* — Armando Rodriguez
(74) *Attorney, Agent, or Firm* — Hogan Lovells US LLP

(57) ABSTRACT

A laser system may include: a master oscillator configured to output pulsed laser light; an amplification device for amplifying the pulsed laser light from the master oscillator; a first timing detector configured to detect a first timing at which the master oscillator outputs the pulsed laser light; a second timing detector configured to detect a second timing at which the amplification device discharges; and a controller configured to, based on results of detection by the first timing detector and the second timing detector, control at least one of the first timing and the second timing so that the amplification device discharges when the pulsed laser light passes through a discharge space of the amplification device.

7 Claims, 18 Drawing Sheets

LASER SYSTEM AND LASER LIGHT GENERATION METHOD

CROSS-REFERENCE TO RELATED APPLICATION

The present application claims priority from Japanese Patent Application No. 2011-071168 filed Mar. 28, 2011.

BACKGROUND

1. Technical Field

The present disclosure relates to laser systems and laser light generation methods.

2. Related Art

Typical ultraviolet light source excimer lasers used in semiconductor lithography processes include a KrF excimer laser having a wavelength of approximately 248 nm and an ArF excimer laser having a wavelength of approximately 193 nm.

Most such ArF excimer lasers are supplied to market as two-stage laser systems that include an oscillation stage laser and an amplifier stage. A basic configuration that is common between the oscillation stage laser and the amplifier stage in a two-stage ArF excimer laser system will be described here. The oscillation stage laser has a first chamber, whereas the amplifier stage has a second chamber. A laser gas (a mixed gas including $F_2$, Ar, Ne, and Xe) is sealed into the respective first and second chambers. The oscillation stage laser and the amplifier stage also have power sources that supply electrical energy for pumping the laser gas. Separate power sources can be supplied for the oscillation stage laser and the amplifier stage, respectively, but a single power source can also be shared between the two. First discharge electrodes including a first anode and a first cathode that are both connected to the power source are provided within the first chamber, and likewise, second discharge electrodes including a second anode and a second cathode that are both connected to the power source are provided within the second chamber.

A configuration unique to the oscillation stage laser is, for example, a line narrowing module. A line narrowing module typically includes a single grating and at least one prism beam expander. A semitransparent mirror and the grating configure an optical resonator, and the first chamber of the oscillation stage laser is disposed between the semitransparent mirror and the grating.

When a charge is generated between the first anode and the first cathode of the first discharge electrodes, the laser gas is pumped, and light is generated when the pumping energy is emitted. This light results in laser light whose wavelength has been selected by the line narrowing module, and the laser light is outputted from the oscillation stage laser.

A two-stage laser system in which the amplifier stage is a laser including a resonator structure is called "MOPO," whereas a two-stage laser system in which the amplifier stage does not include a resonator structure and is not a laser is called "MOPA." When the laser light from the oscillation stage laser is present within the second chamber of the amplifier stage, control is carried out so that a discharge is created between the second anode and the second cathode of the second discharge electrodes. Through this, the laser gas within the second chamber is pumped, and the laser light is amplified and outputted from the amplifier stage.

SUMMARY

A laser system according to an aspect of the present disclosure may include: a master oscillator configured to output pulsed laser light; an amplification device for amplifying the pulsed laser light from the master oscillator; a first timing detector configured to detect a first timing at which the master oscillator outputs the pulsed laser light; a second timing detector configured to detect a second timing at which the amplification device discharges; and a controller configured to, based on results of detection by the first timing detector and the second timing detector, control at least one of the first timing and the second timing so that the amplification device discharges when the pulsed laser light passes through a discharge space of the amplification device.

A laser light generation method according to another aspect of the present disclosure is a laser light generation method for an apparatus including a master oscillator, an amplification device, a first timing detector configured to detect a first timing at which the master oscillator outputs pulsed laser light, and a second timing detector configured to detect a second timing at which the amplification device discharges, and the method may include controlling, based on results of detection by the first timing detector and the second timing detector, at least one of the first timing and the second timing so that the amplification device discharges when the pulsed laser light passes through a discharge space of the amplification device.

BRIEF DESCRIPTION OF DRAWINGS

Embodiments of the present disclosure will be described as examples hereinafter with reference to the appended drawings.

DESCRIPTION OF PREFERRED EMBODIMENTS

Figure 1:
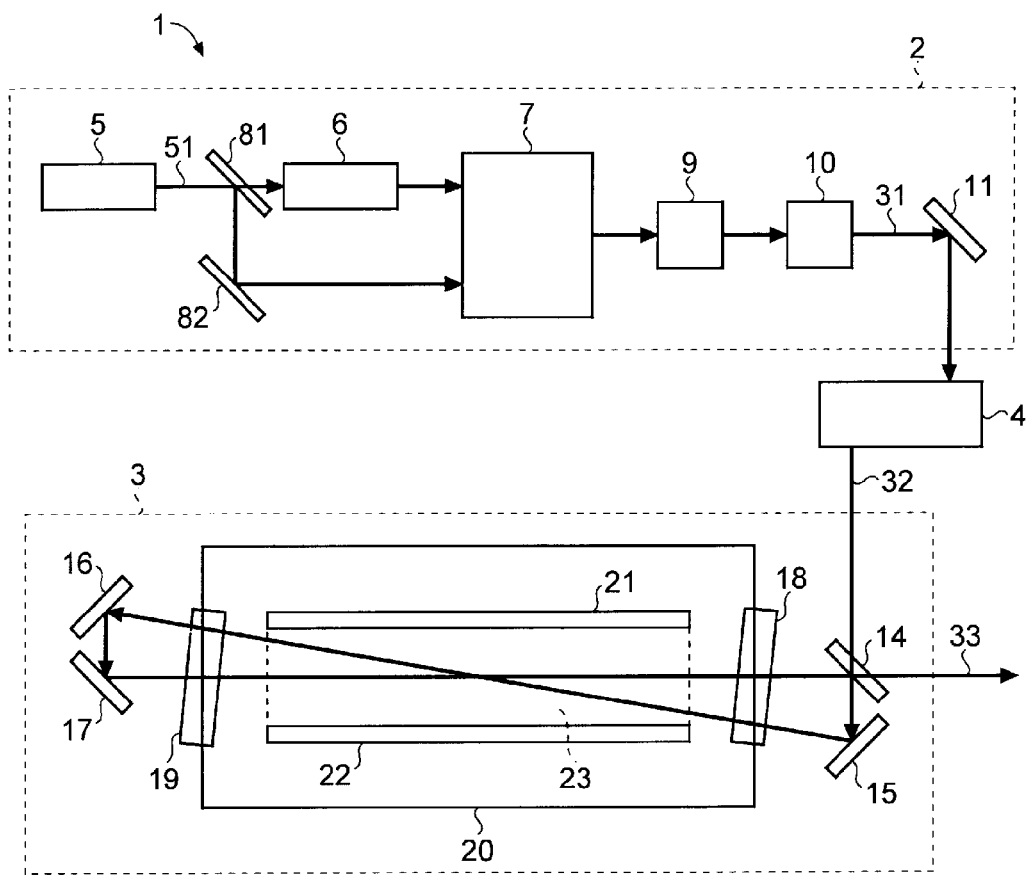
FIG. 1 illustrates the general configuration of an example of a two-stage laser apparatus using a solid-state laser device having a wavelength conversion element according to a first embodiment of the present disclosure.

Embodiments of the present disclosure will be described in detail hereinafter with reference to the drawings. The embodiments described hereinafter indicate examples of the present disclosure, and are not intended to limit the content of the present disclosure. Furthermore, not all of the configurations and operations described in the embodiments are required configurations and operations in the present disclosure. Note that identical constituent elements will be given identical reference characters, and duplicate descriptions thereof will be omitted. The description is given following the table of contents below.

Table of Contents

1. Outline
2. Explanation of Terms
3. Laser System Including Master Oscillator and Amplification Device (First Embodiment)
3.1 Configuration
3.2 Operations
4. Laser System Performing Feedback Control on Synchronization of Master Oscillator and Amplification Device (Second Embodiment)
4.1 Configuration
4.2 Operations
4.3 Effects
4.4 Example of Sensor Arrangement for Measuring Oscillation Timing
4.5 Example of Sensor for Measuring Discharge Timing
4.5.1 Example of Measuring Discharge Timing Using Sensor within Laser Power Source
4.5.1.1 First Configuration Example of Sensor
4.5.1.2 Second Configuration Example of Sensor
4.5.2 Example of Measuring Discharge Timing Using Optical Sensor
4.6 Flowcharts
5. Laser System Performing Feedback Control on Synchronization of Master Oscillator Including Optical Shutter and Amplification Device (Third Embodiment)
5.1 Configuration
5.1.1 Optical Shutter
5.2 Operations
5.3 Effects
5.4 Flowchart
6. Additional Descriptions
6.1 Ti:Sapphire Laser
6.2 Amplifier (PA)
6.3 Amplifier Including Optical Resonator (PO)

1. Outline

In the embodiments described as examples hereinafter, pulsed laser light outputted from a master oscillator and the operation (discharge) timing of an amplification device containing a laser gas may be synchronized.

2. Explanation of Terms

A "KBBF crystal" is a nonlinear optical crystal expressed by the chemical formula $KBe_2BO_3F_2$, and serves as a wavelength conversion element. "Burst oscillation" refers to outputting pulsed laser light at a predetermined repetition rate during a predetermined interval. An "optical path" is a path along which laser light is transmitted.

3. Laser System Including Master Oscillator and Amplification Device

First Embodiment 3.1 Configuration

FIG. 1 illustrates the general configuration of an example of a two-stage laser apparatus according to a first embodiment of the present disclosure.

A two-stage laser apparatus (called a "laser system" hereinafter) 1 may include a master oscillator 2 and an amplification device 3. The master oscillator 2 may, for example, include a wavelength conversion element. The amplification device 3 may, for example, be a discharge-pumped ArF excimer amplifier. A low-coherence optical system 4 may be disposed between the master oscillator 2 and the amplification device 3. A system, such as an optical pulse stretcher, a random phase plate, or the like, may be employed as the low-coherence optical system 4.

The master oscillator 2 will be described next. The master oscillator 2 may include a pumping laser 5, a Ti:sapphire laser 6, an amplifier 7, a beam splitter 81, a high-reflection mirror 82, an LBO crystal 9, a KBBF crystal 10, and a high-reflection mirror 11.

The pumping laser 5 may be a laser that, for example, oscillates second harmonic light of a semiconductor laser-pumped Nd:YAG laser. The Ti:sapphire laser 6 may include a Ti:sapphire crystal and an optical resonator. The amplifier 7 may be an amplifier that includes a Ti:sapphire crystal.

The amplification device 3 will be described next. The amplification device 3 may include a chamber 20, a pair of discharge electrodes (an anode 21 and a cathode 22), an output coupling mirror 14, and high-reflection mirrors 15, 16, and 17. A laser gas may be sealed into the chamber 20. This laser gas may be a mixed gas of Ar, Ne, $F_2$, and Xe. The anode 21 and the cathode 22 may be disposed within the chamber 20. The anode 21 and the cathode 22 may be disposed with a space provided therebetween in the direction that follows the depiction in FIG. 1. The anode 21 and the cathode 22 may be disposed in the vertical direction with respect to the depiction as illustrated in FIG. 1. The space between the anode 21 and the cathode 22 may be a discharge space 23. Windows 18 and 19, through which pulsed laser light 32 passes, may be provided in the chamber 20. In addition, a power source (not shown) may be disposed outside the chamber 20.

The output coupling mirror 14 and the high-reflection mirrors 15, 16, and 17 may configure a ring optical resonator. The output coupling mirror 14 may be an element that allows a part of light to pass therethrough while reflecting another part of light.

3.2 Operations

The master oscillator 2 may output pulsed laser light 31 at a wavelength of approximately 193 nm. The low-coherence optical system 4 may then reduce the coherence of the pulsed laser light 31. The amplification device 3 may amplify the pulsed laser light 32, whose coherence has been reduced, and output that light as pulsed laser light 33. The pulsed laser light 33 may, for example, be transmitted to a semiconductor exposure apparatus (not shown) and used in exposure processes.

Pumping light 51 at a wavelength of approximately 532 nm may be outputted from the pumping laser 5. Part of the pumping light 51 may pass through the beam splitter 81. Another part of the pumping light 51 may be reflected by the beam splitter 81. The pumping light 51 that has passed through the beam splitter 81 may pump the Ti:sapphire laser 6. Pulsed laser light at a wavelength of approximately 773.6 nm may be outputted from the pumped laser 6. Here, the Ti:sapphire laser 6 may include an optical resonator provided with a wavelength selection element (not shown). Pulsed laser light having a spectral linewidth that has been narrowed by the wavelength selection element may be outputted from the Ti:sapphire laser 6.

Of the pumping light 51 outputted from the pumping laser 5, the pumping light 51 reflected by the beam splitter 81 may further be reflected by the high-reflection mirror 82. The reflected pumping light 51 may enter the Ti:sapphire amplifier 7 and may then pump the Ti:sapphire crystal provided therein. The amplifier 7 may amplify the pulsed laser light outputted from the Ti:sapphire laser 6 using that pumping energy. As a result, pulsed laser light at a wavelength of approximately 773.6 nm may be outputted from the amplifier 7.

The pulsed laser light outputted from the Ti:sapphire amplifier 7 may be converted into pulsed laser light at a wavelength of approximately 386.8 nm (one-half of the aforementioned 773.6 nm) by passing through the LBO crystal 9, which serves as a wavelength conversion element. The pulsed laser light that has experienced the wavelength conversion may further be converted into pulsed laser light 31 at a wavelength of approximately 193.4 nm (one-half of the aforementioned 386.8 nm) by passing through the KBBF crystal 10, which serves as a wavelength conversion element.

The travel direction of the pulsed laser light 31 that has passed through the KBBF crystal 10 may be changed by the high-reflection mirror 11, and may enter the low-coherence optical system 4. The coherence of the pulsed laser light 31 may be reduced by passing through the low-coherence optical system 4. The pulsed laser light 32 whose coherence has been reduced may then enter the amplification device 3.

The power source electrically connected to the anode 21 and the cathode 22 within the chamber 20 may apply a potential difference between the anode 21 and the cathode 22. Through this, a discharge may occur between the anode 21 and the cathode 22 at the timing at which the pulsed laser light 32 passes through the discharge space 23 in the amplification device 3.

Part of the pulsed laser light 32 emitted by the low-coherence optical system 4 may pass through the output coupling mirror 14 and be reflected by the high-reflection mirror 15. This pulsed laser light 32 may then pass through the window 18 and advance into the discharge space 23 between the anode 21 and the cathode 22. The pulsed laser light 32 may be amplified by carrying out control so that a discharge occurs in the discharge space 23 when the pulsed laser light 32 is present in the discharge space 23. The amplified pulsed laser light 32 may be emitted from the chamber 20 through the window 19. The emitted pulsed laser light 32 may be highly reflected by the high-reflection mirrors 16 and 17, and may then once again advance into the discharge space 23 within the chamber 20 via the window 19. This pulsed laser light 32 may then be emitted from the chamber 20 through the window 18. The emitted pulsed laser light 32 may then enter the output coupling mirror 14. Part of the pulsed laser light 32 may pass through the output coupling mirror 14 and be outputted from the amplification device 3 as the pulsed laser light 33. Another part of the pulsed laser light 32 may be returned into the ring optical resonator as feedback light by being reflected by the output coupling mirror 14.

Although the case where the amplification device 3 includes a ring optical resonator is mentioned as an example in these descriptions, the disclosure is not limited thereto. For example, the amplification device 3 may include a Fabry-Perot resonator in which an optical resonator is provided in an amplifier.

4. Laser System Performing Feedback Control on Synchronization of Master Oscillator and Amplification Device Second Embodiment Next, a laser system 1A according to a second embodiment of the present disclosure will be described in detail with reference to the drawings.

4.1 Configuration

Figure 2:
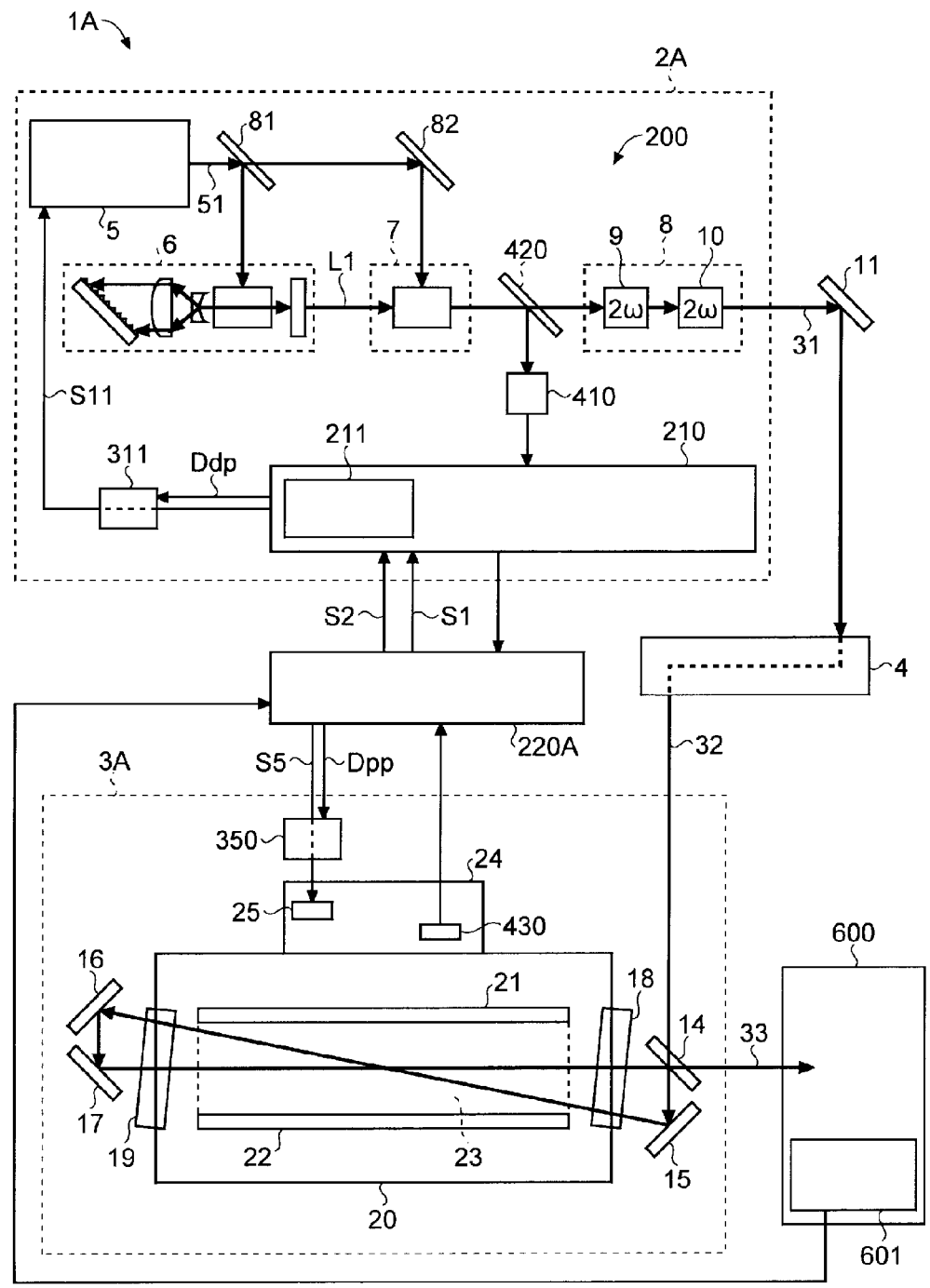
FIG. 2 illustrates the general configuration of a laser system according to a second embodiment of the present disclosure.

FIG. 2 illustrates the general configuration of the laser system 1A according to the second embodiment. As shown in FIG. 2, the laser system 1A may include a master oscillator 2A, the high-reflection mirror 11, the low-coherence optical system 4, an amplification device 3A, and a laser controller 220A. The laser controller 220A may control the overall operations of the laser system 1A.

The master oscillator 2A may include a solid-state laser device 200 and a controller 210. The solid-state laser device 200 may include, as in the master oscillator 2 illustrated in FIG. 1, the pumping laser 5, the Ti:sapphire laser 6 (a seed laser), the amplifier 7, a wavelength conversion unit 8 that includes the LBO crystal 9 and the KBBF crystal 10, the beam splitter 81, and the high-reflection mirror 82.

The controller 210 may be a synchronization control device that controls the timing at which the pulsed laser light 31 is outputted. Such a controller 210 may include an internal trigger oscillator 211. The internal trigger oscillator 211 may, for example, oscillate an internal trigger at a predetermined repetition rate. The controller 210 may transmit this internal trigger to the pumping laser 5 as a pumping laser oscillation signal S11.

In addition, the controller 210 may, for example, receive a trigger signal 51 at an approximately predetermined repetition rate from the laser controller 220A or the like, which serves as a higher-level controller. The controller 210 may transmit the trigger signal S1 received from the laser controller 220A to the pumping laser 5 as the pumping laser oscillation signal S11. Through this, the pumping laser 5 can continuously output the pumping light 51 at the approximately predetermined repetition rate.

The master oscillator 2A may include an oscillation delay circuit 311. The oscillation delay circuit 311 may delay the pumping laser oscillation signal S11 outputted from the controller 210 to the pumping laser 5 by an amount equivalent to a predetermined delay time (an oscillation delay time Ddp) in order to adjust the timing relative to the amplification device 3A.

In addition, the master oscillator 2A may include a beam splitter 420 and an optical sensor 410. The beam splitter 420 may be disposed in the optical path of pulsed laser light L1 that travels within the solid-state laser device 200. The optical sensor 410 may detect the pulsed laser light L1 split by the beam splitter 420. The result of the detection of the pulsed laser light L1 by the optical sensor 410 may be inputted into the laser controller 220A via the controller 210. The laser controller 220A may specify an oscillation timing Tmo of the pulsed laser light L1 based on the inputted detection result.

In addition to the same constituent elements as the amplification device 3 shown in FIG. 1, the amplification device 3A may include a laser power source 24 and a switch delay circuit 350. The laser power source 24 may be electrically connected to the anode 21 and the cathode 22 in the chamber 20. The switch delay circuit 350 may delay a switch signal S5 outputted from the laser controller 220A to a switch 25 in the laser power source 24 by an amount equivalent to a predetermined delay time (a switch delay time Dpp).

In addition, the amplification device 3A may include a sensor 430 that detects a discharge timing Tpo, which is a timing at which a discharge has occurred in the discharge space 23, or a timing at which a discharge is caused to occur in the discharge space 23.

4.2 Operations

Next, an overview of operations performed by the laser system 1A will be given. The laser controller 220A may receive, from an exposure controller 601 in an exposure apparatus 600, a request for burst output of the pulsed laser light 33. When the burst output has been requested, the laser controller 220A may output a burst request signal S2 to the controller 210 of the master oscillator 2A. In addition, the laser controller 220A may output the trigger signal S1 to the controller 210 at an approximately predetermined repetition rate. The controller 210 may output the trigger signal S1 or the internal trigger generated by the internal trigger oscillator 211 to the pumping laser 5 as the pumping laser oscillation signal S11. The pumping laser oscillation signal S11 may be inputted into the pumping laser 5 having been delayed by an amount equivalent to a predetermined delay time (the oscillation delay time Ddp) relative to the input of the trigger signal S1 by passing through the oscillation delay circuit 311. When the pumping laser oscillation signal S11 is inputted, the pumping laser 5 may output the pumping light 51. Through this, the pulsed laser light L1 may be generated within the solid-state laser device 200.

The pulsed laser light L1 generated within the solid-state laser device 200 may travel along the optical path within the solid-state laser device 200. The optical sensor 410 may detect the timing at which the pulsed laser light L1 passes a predetermined position in the optical path. The result of this timing detection may be outputted from the optical sensor 410 to the laser controller 220A via the controller 210. The laser controller 220A may specify the oscillation timing Tmo of the pulsed laser light L1 based on the inputted detection result.

The laser controller 220A may output the switch signal S5 to the laser power source 24 of the amplification device 3 at an approximately predetermined repetition rate. The laser controller 220A may output the switch signal S5 continuously, or may output the switch signal S5 only during a period in which burst output is being requested by the exposure controller 601. The switch signal S5 may be inputted into the switch 25 of the laser power source 24 having been delayed by an amount equivalent to a predetermined delay time relative to the output of the trigger signal S1 (the switch delay time Dpp) by passing through the switch delay circuit 350. When the switch 25 is turned on by the switch signal S5, the laser power source 24 may apply a potential difference for discharge between the anode 21 and the cathode 22. As a result, a discharge can occur in the discharge space 23 between the anode 21 and the cathode 22.

It is desirable to match the timing at which the discharge is caused to occur in the discharge space 23 with the timing at which the pulsed laser light 32, which has entered the amplification device 3 from the master oscillator 2A through the low-coherence optical system 4, passes through the chamber 20 (synchronization). The oscillation delay time Ddp and the switch delay time Dpp for achieving this synchronization may be found in advance through experience, experiments, or simulations. In addition, at least one of the oscillation delay time Ddp and the switch delay time Dpp may undergo feedback control based on a difference between the timing of the pulsed laser light L1 and the timing of the discharge. The timing of the pulsed laser light L1 may, for example, be the oscillation timing Tmo of the pumping laser 5. The timing at which the pulsed laser light L1 passes the predetermined position may be used as the oscillation timing Tmo. In addition, the discharge timing may be the discharge timing Tpo at which a discharge is caused to occur in the discharge space 23. The timing at which the electric power used for discharge is supplied between the anode 21 and the cathode 22 may be used as the discharge timing Tpo.

4.3 Effects

In the second embodiment, the laser controller 220A may detect a difference between the timing of the pulsed laser light L1 (for example, the oscillation timing Tmo) and the timing of the discharge (for example, the discharge timing Tpo). In accordance with that difference, the laser controller 220A may carry out feedback control on the oscillation timing Tmo of the pumping laser 5 and the discharge timing Tpo of the amplification device 3A. Through this, a discharge can be caused to occur in the discharge space 23 in correspondence with the timing at which the pulsed laser light 32 passes through the discharge space 23 within the amplification device 3A. As a result, the influence of drift in the oscillation timing Tmo and the discharge timing Tpo can be reduced, which makes it possible to amplify the pulsed laser light 32 in a more stable manner.

4.4 Example of Sensor Arrangement for Measuring Oscillation Timing

Figure 3:
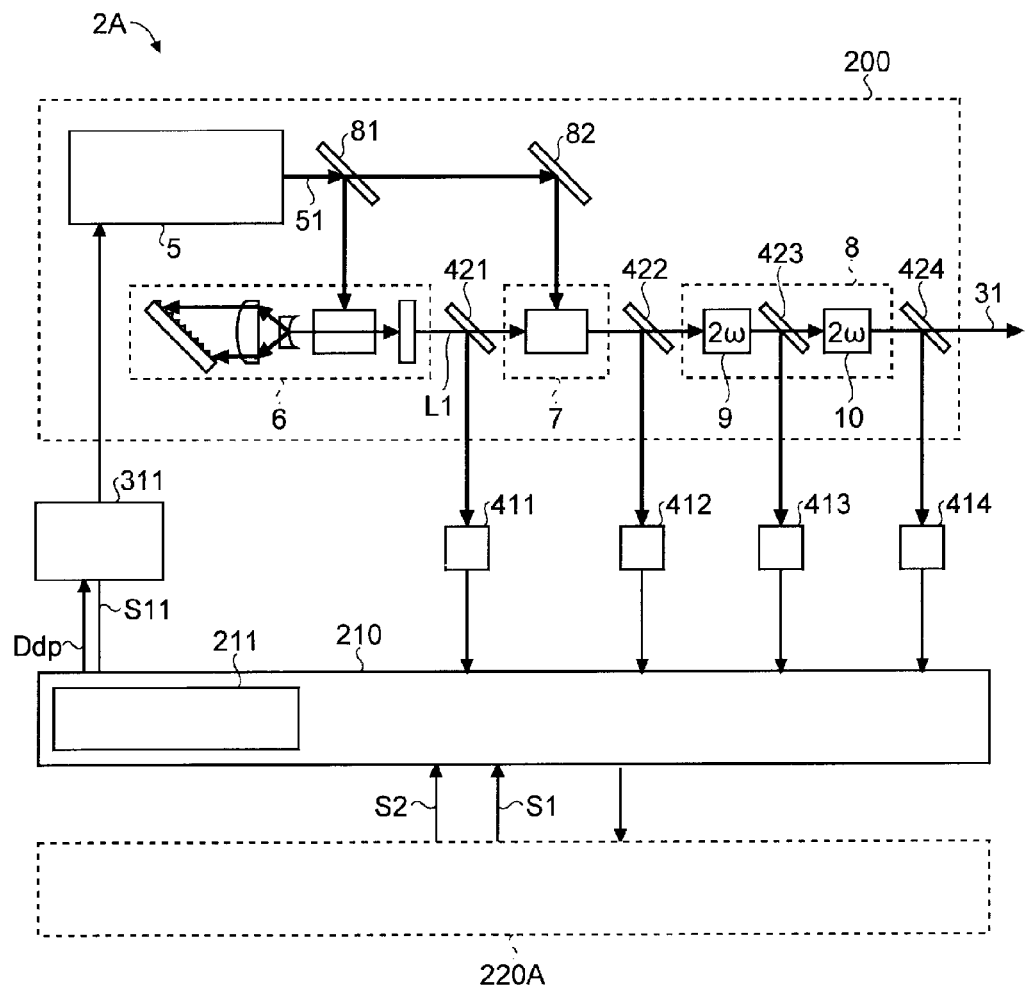
FIG. 3 illustrates an example of an oscillation timing detection position according to the second embodiment.

Here, an example of the detection position for the oscillation timing Tmo will be described using FIG. 3. As indicated by beam splitters 421, 422, and 424, and optical sensors 411, 412, and 414 in FIG. 3, the detection position for the oscillation timing Tmo may be at at least one of the output stages including the Ti:sapphire laser 6, the amplifier 7, and the wavelength conversion unit 8. Meanwhile, the detection position for the oscillation timing Tmo may be between the LBO crystal 9 and the KBBF crystal 10 within the wavelength conversion unit 8, as indicated by a beam splitter 423 and an optical sensor 413 in FIG. 3.

4.5 Example of Sensor for Measuring Discharge Timing

An example of a sensor that detects the discharge timing Tpo will be described hereinafter.

Figure 4:
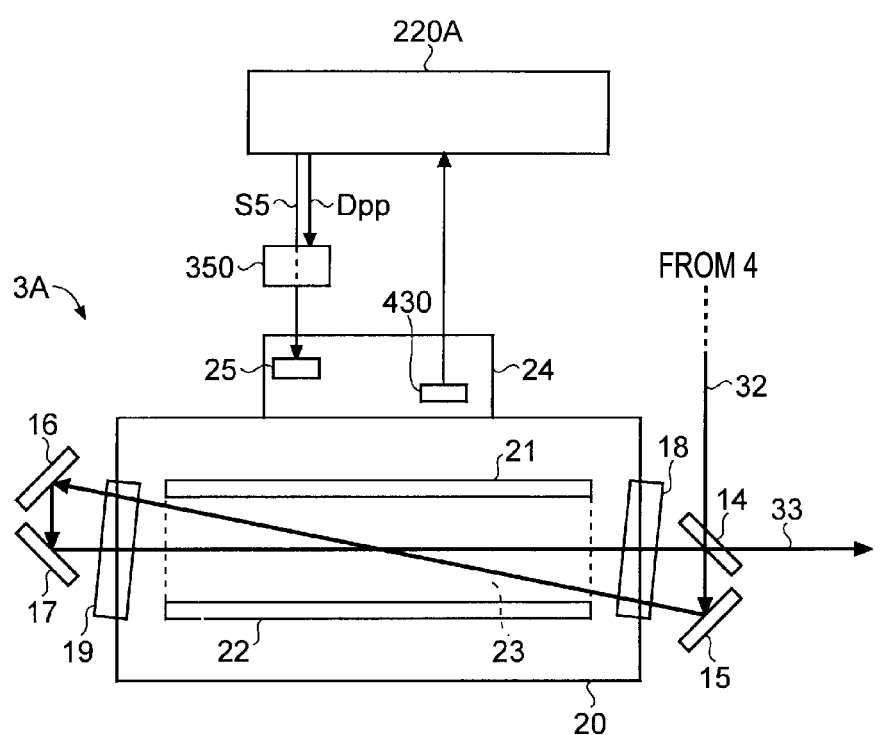
FIG. 4 illustrates an example of a configuration that measures the timing at which electrical power for a discharge is supplied according to the second embodiment.

4.5.1 Example of Measuring Discharge Timing Using Sensor within Laser Power Source First, an example in which the timing at which the discharge voltage is applied between the anode 21 and the cathode 22 is detected as the discharge timing Tpo will be described. FIG. 4 is an example of the configuration that measures the timing at which the discharge voltage is applied. As with the amplification device 3A shown in FIG. 4, in the case where the timing at which the discharge voltage is applied is detected as the discharge timing Tpo, the sensor 430 may be disposed within the laser power source 24.

4.5.1.1 First Configuration Example of Sensor

Figure 5:
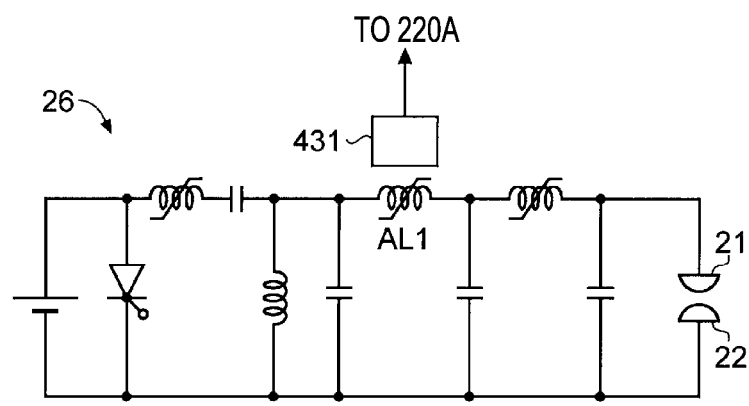
FIG. 5 illustrates a specific example of a sensor.

The sensor 430 will be described in more detail. FIG. 5 illustrates an example of a case in which a magnetic switch-operated sensor 431 is used as the sensor 430. As shown in FIG. 5, the magnetic switch-operated sensor 431 may be provided for a saturable reactor AL1 in a magnetic pulse compression circuit 26 that applies a voltage used to generate a discharge between the anode 21 and the cathode 22. The saturable reactor AL1 is what is known as a magnetic switch. The magnetic switch-operated sensor 431 may detect the point in time of saturation of the saturable reactor AL1. The magnetic switch-operated sensor 431 may output the detected point in time of saturation to the laser controller 220A. The laser controller 220A may specify the inputted point in time of saturation as the discharge timing Tpo.

4.5.1.2 Second Configuration Example of Sensor

Figure 6:
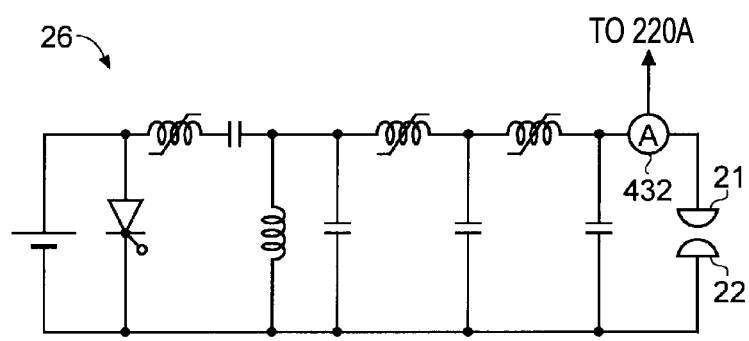
FIG. 6 illustrates another specific example of a sensor.

Another example of the configuration of the sensor 430 will be described. FIG. 6 illustrates an example of a case where a current sensor 432 is used as the sensor 430. As shown in FIG. 6, the current sensor 432 may be connected in series between the magnetic pulse compression circuit 26 and the anode 21. The current sensor 432 may measure a current value of a current flowing through the anode 21. The current sensor 432 may output the detected current value to the laser controller 220A. The laser controller 220A may specify the timing at which the current flows through the anode 21 as the discharge timing Tpo, based on the inputted current value.

4.5.2 Example of Measuring Discharge Timing Using Optical Sensor

Figure 7:
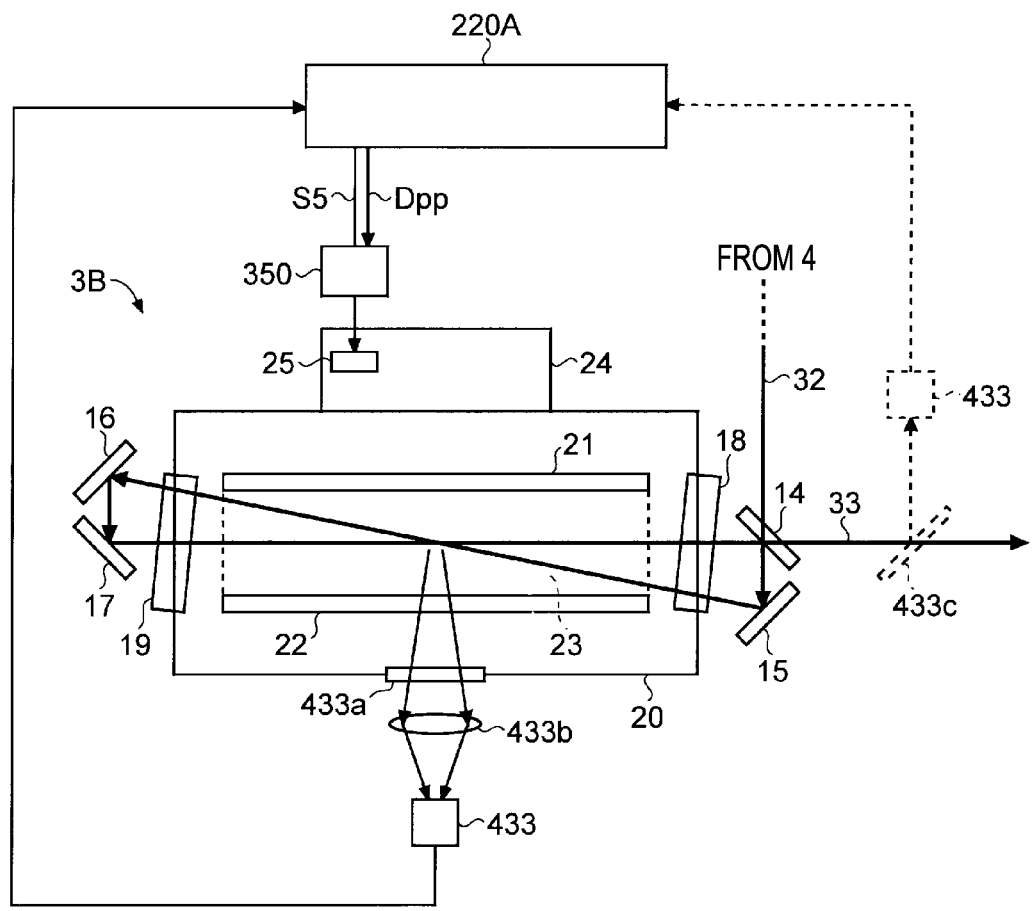
FIG. 7 illustrates a case for detecting the actual occurrence of a discharge in a discharge space using an optical sensor according to the second embodiment.

Next, an example of a case where an optical sensor 433 is used as the sensor 430 will be described. FIG. 7 illustrates a case where the actual occurrence of a discharge in the discharge space 23 is detected using the optical sensor 433. With an amplification device 3B illustrated in FIG. 7, a window 433a that allows discharge light that has occurred in the discharge space 23 to pass through may be provided in the chamber 20. The discharge light emitted from the discharge space 23 via the window 433a may be captured by a light-receiving surface of the optical sensor 433 through a transfer lens 433b. The optical sensor 433 may detect the occurrence of a discharge in the discharge space 23 by detecting the captured discharge light. In addition, the optical sensor 433 may output the detection result to the laser controller 220A. The laser controller 220A may specify the discharge timing Tpo based on the inputted detection result.

In addition, the discharge timing Tpo may be detected by the optical sensor 433 detecting the pulsed laser light 33 emitted from the chamber 20. In this case, as indicated by the broken line in FIG. 7, a beam splitter 433c may be disposed in the optical path of the pulsed laser light 33. Part of the pulsed laser light 33 split by the beam splitter 433c may enter the optical sensor 433. The optical sensor 433 may detect the occurrence of a discharge in the discharge space 23 by detecting the pulsed laser light 33 that has entered. In addition, the optical sensor 433 may output the detection result to the laser controller 220A. The laser controller 220A may specify the discharge timing Tpo based on the inputted detection result.

4.6 Flowcharts

Figure 8:
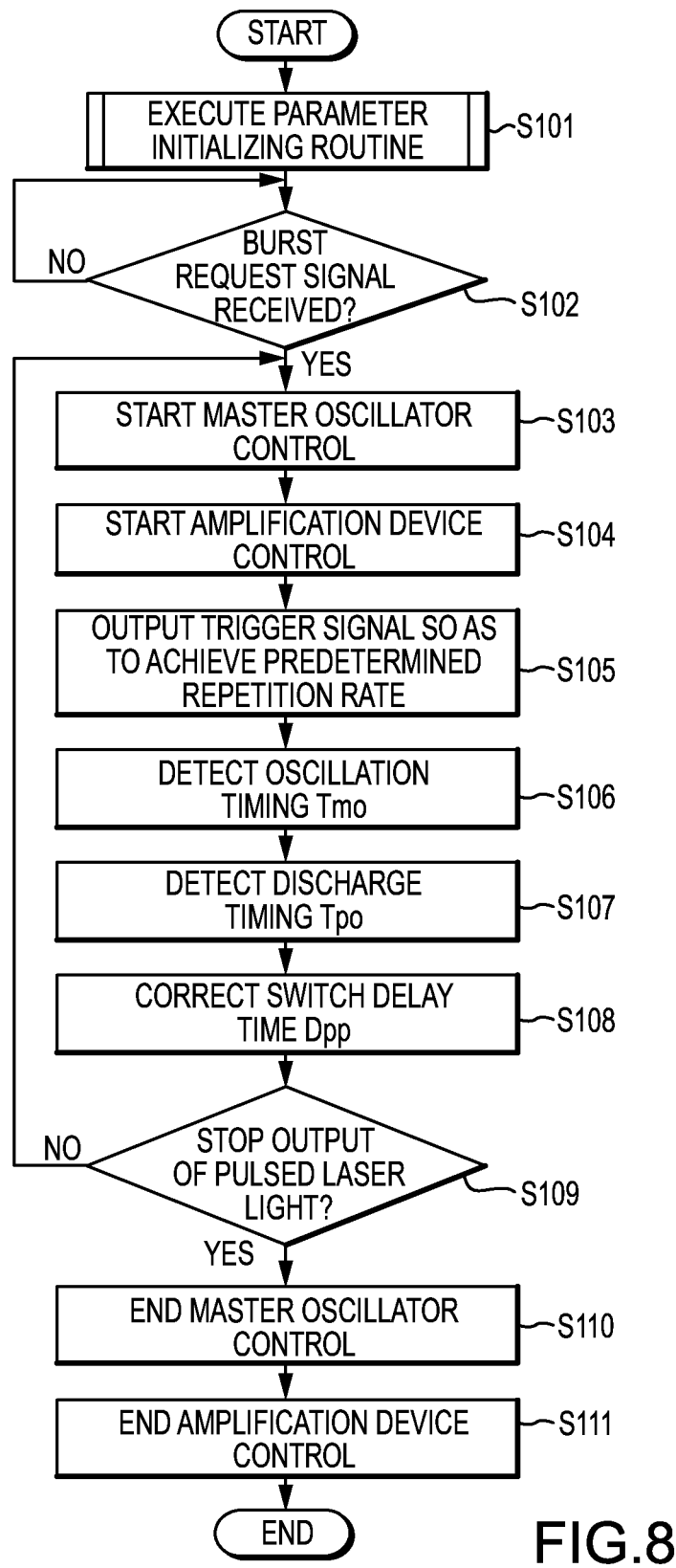
FIG. 8 is a flowchart illustrating an overview of the operations performed by the laser system according to the second embodiment of the present disclosure.
Figure 9:
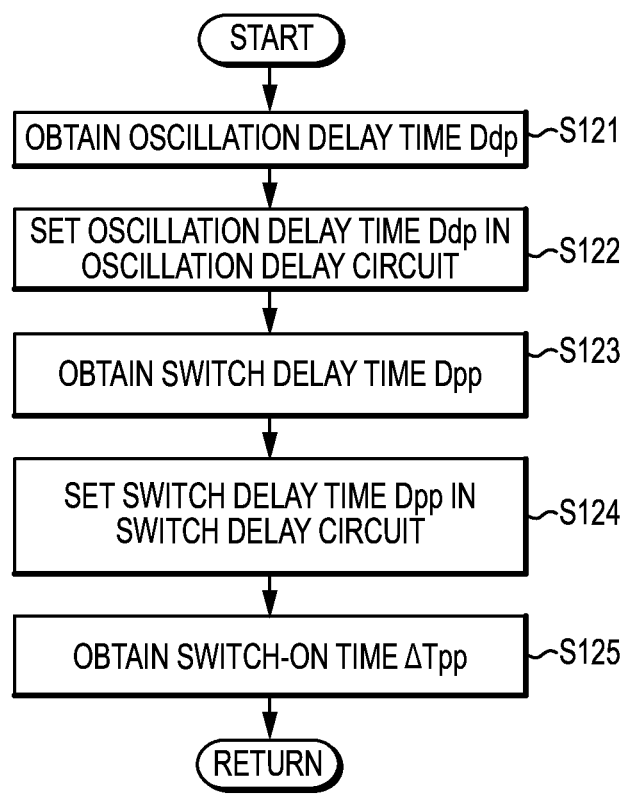
FIG. 9 is a flowchart illustrating an overview of the operations in a parameter initializing routine, indicated in step S101 of FIG. 8, according to the second embodiment.
Figure 10:
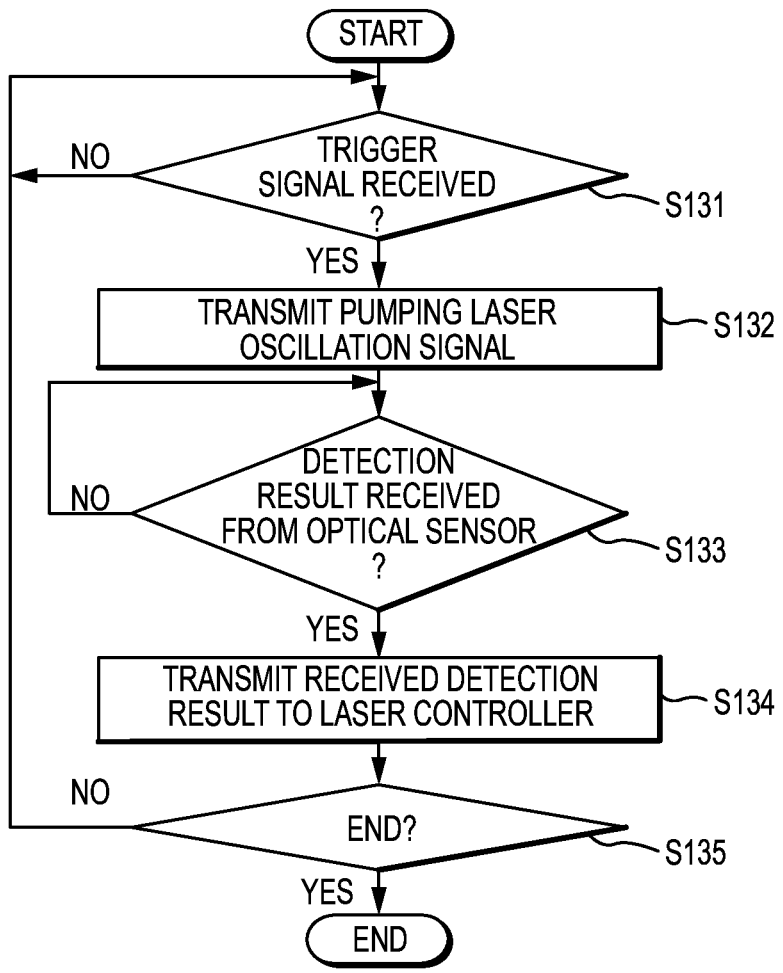
FIG. 10 is a flowchart illustrating the operations started by a controller in step S103 of FIG. 8, according to the second embodiment.
Figure 11:
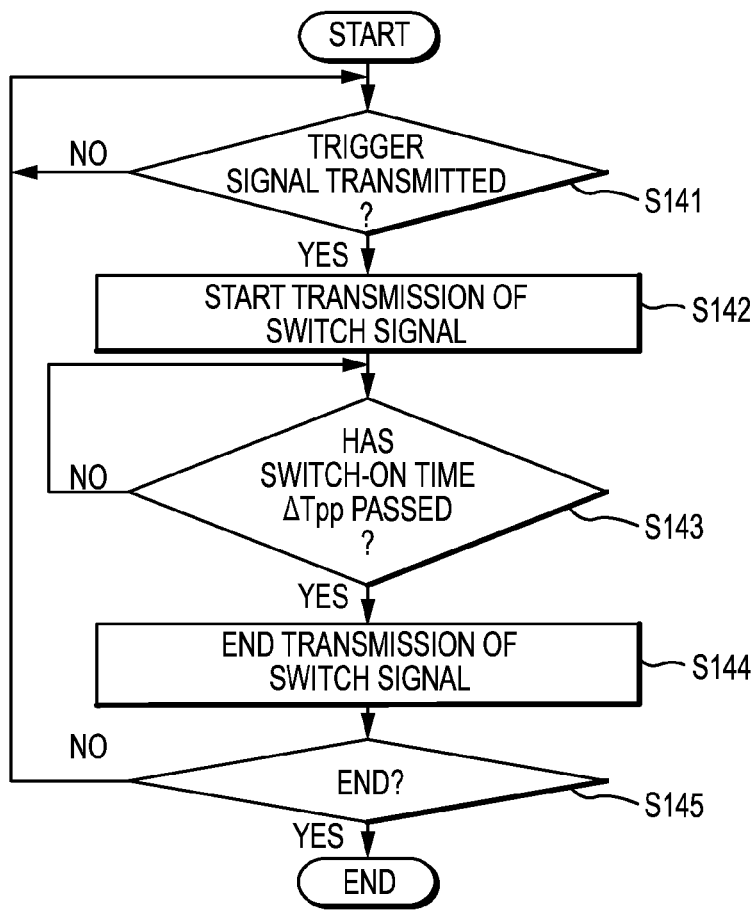
FIG. 11 is a flowchart illustrating the operations started by a laser controller in step S104 of FIG. 8, according to the second embodiment.
Figure 12:
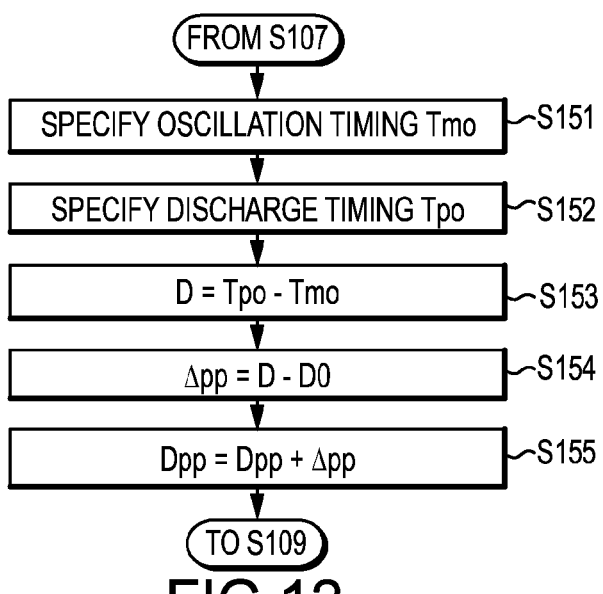
FIG. 12 is a flowchart illustrating details of step S108 of FIG. 8 according to the second embodiment.

Next, operations performed by the laser system 1A illustrated in FIG. 2 will be described in detail with reference to the drawings. FIG. 8 is a flowchart illustrating an overview of the operations of the laser system 1A. FIG. 9, meanwhile, is a flowchart illustrating an overview of the operations performed in a parameter initializing routine, indicated in step S101 of FIG. 8. FIG. 10 is a flowchart illustrating the operations started by the controller 210 in step S103 of FIG. 8. FIG. 11 is a flowchart illustrating operations started by the laser controller 220A in step S104 of FIG. 8. FIG. 12 is a flowchart illustrating step S108 of FIG. 8 in detail. Note that FIG. 8, FIG. 9, FIG. 11, and FIG. 12 indicate the operations performed by the laser controller 220A. FIG. 10, meanwhile, indicates the operations performed by the controller 210.

As shown in FIG. 8, after starting up, the laser controller 220A may execute a parameter initializing routine that initializes various parameters (step S101). Note that the initial parameters to be set may be recorded in advance, or may be inputted or requested from an external device, such as from the exposure controller 601.

Next, the laser controller 220A may stand by until a burst request signal, requesting a burst of the pulsed laser light 33, is received from the exposure controller 601 or the like (step S102; NO). When the burst request signal has been received (step S102; YES), the laser controller 220A may execute control causing the master oscillator 2A to output a burst of the pulsed laser light 31 (step S103). Along with this, the laser controller 220A may execute control causing the amplification device 3A to perform a discharge (step S104).

Next, the laser controller 220A may output the trigger signal S1 to the controller 210 so as to achieve a predetermined repetition rate (step S105). The laser controller 220A may then detect the oscillation timing Tmo from the result of the detection performed by the optical sensor 410 that has been inputted from the controller 210 (step S106). In addition, the laser controller 220A may detect the discharge timing Tpo from the detection result inputted from the sensor 430 (step S107). Next, the laser controller 220A may correct the switch delay time Dpp of the switch delay circuit 350 (or the oscillation delay time Ddp of the oscillation delay circuit 311) based on a time difference between the oscillation timing Tmo and the discharge timing Tpo (step S108).

Thereafter, the laser controller 220A may determine whether or not to stop the output of the pulsed laser light 33 (step S109). In the case where the output is to be stopped (step S109; YES), the laser controller 220A may end the control of the master oscillator 2A started in step S103 (step S110). In addition, the laser controller 220A may end the control of the amplification device 3A started in step S104 (step S111), and thereafter, may end the present operations. On the other hand, in the case where the output is not to be stopped (step S109; NO), the laser controller 220A may return to step S103 and execute the operations that follow thereafter.

Next, an overview of the operations in the parameter initializing routine indicated in step S101 of FIG. 8 will be described. As shown in FIG. 9, in the parameter initializing routine, the laser controller 220A may obtain the oscillation delay time Ddp set in the oscillation delay circuit 311 (step S121). The obtained oscillation delay time Ddp may be a default value stored in advance in a memory or the like (not shown), or may be a value newly calculated by the laser controller 220A. Continuing on, the laser controller 220A may set the obtained oscillation delay time Ddp in the oscillation delay circuit 311 via the controller 210 (step S122). Note that when setting the oscillation delay time Ddp in the oscillation delay circuit 311, the laser controller 220A may carry out the setting through the controller 210, as shown in FIG. 3. Through this, the timing of the pumping laser oscillation signal S11 that passes through the oscillation delay circuit 311 may be delayed by an amount equivalent to the oscillation delay time Ddp.

Next, the laser controller 220A may obtain the switch delay time Dpp set in the switch delay circuit 350 (step S123). The obtained switch delay time Dpp may be a default value stored in advance in a memory or the like (not shown), or may be a value newly calculated by the laser controller 220A. Then, the laser controller 220A may set the obtained switch delay time Dpp in the switch delay circuit 350 (step S124). Through this, the timing of the switch signal S5 that passes through the switch delay circuit 350 may be delayed by an amount equivalent to the switch delay time Dpp.

Next, the laser controller 220A may obtain a time to turn the switch 25 on, or in other words, a time for which to apply a discharge voltage between the anode 21 and the cathode 22 (that is, a switch-on time ΔTpp) (step S125). The obtained switch-on time ΔTpp may be a default value stored in advance in a memory or the like (not shown), or may be a value newly calculated by the laser controller 220A. Thereafter, the laser controller 220A may return to the operations indicated in FIG. 8.

Operations started by the controller 210 in step S103 of FIG. 8 will now be described. As shown in FIG. 10, under the control of the laser controller 220A, the controller 210 may stand by until, for example, the trigger signal S1 is received from the laser controller 220A (step S131; NO).

When the trigger signal S1 has been received (step S131; YES), the controller 210 may transmit the trigger signal S1 to the pumping laser 5 as the pumping laser oscillation signal S11 (step S132). The pumping laser oscillation signal S11 may be inputted to the pumping laser 5 through the oscillation delay circuit 311. Note that the timing at which the pumping light 51 is outputted from the pumping laser 5 may be directly related to the timing at which the pulsed laser light L1 is outputted from the Ti:sapphire laser 6.

Next, the controller 210 may stand by until the result of detecting the pulsed laser light L1 is inputted from the optical sensor 410 (step S133; NO). When the detection result is inputted from the optical sensor 410 (step S133; YES), the controller 210 may transmit the inputted detection result to the laser controller 220A (step S134). After this, the controller 210 may determine whether or not an end to the operations has been specified by the laser controller 220A or the like (step S135). In the case where the end has been specified (step S135; YES), the controller 210 may end the present operations. However, in the case where the end has not been specified (step S135; NO), the controller 210 may return to step S131.

Next, operations started by the laser controller 220A in step S104 of FIG. 8 will be described. As shown in FIG. 11, the laser controller 220A may stand by until the trigger signal S1 is outputted to the controller 210 (step S141; NO). When the trigger signal S1 is outputted (step S141; YES), the laser controller 220A may start the transmission of the switch signal S5 to the switch 25 (step S142). The switch signal S5 may be inputted to the switch 25 through the switch delay circuit 350. The switch delay time Dpp may be set in the switch delay circuit 350 so that a discharge occurs in the discharge space 23 in correspondence with the timing at which the pulsed laser light 32 passes through the discharge space 23.

Thereafter, the laser controller 220A may measure the time that has elapsed after the start of the transmission of the switch signal S5 using, for example, a timer or the like (not shown). The laser controller 220A may then stand by until the measured time becomes greater than or equal to the pre-set switch-on time ΔTpp (step S143; NO).

When the switch-on time ΔTpp has elapsed (step S143; YES), the laser controller 220A may end the transmission of the switch signal S5 (step S144). Through this, the period in which a discharge occurs in the discharge space 23 may be adjusted. Thereafter, the laser controller 220A may determine whether or not to end the operations (step S145). In the case where the operations are to be ended (step S145; YES), the laser controller 220A may end the present operations. However, in the case where the operations are not to be ended (step S145; NO), the laser controller 220A may return to step S141.

Next, step S108 of FIG. 8 will be described in detail. As shown in FIG. 12, the laser controller 220A may specify the oscillation timing Tmo based on the result of the detection performed by the optical sensor 410 that has been inputted from the controller 210 (step S151). In addition, the laser controller 220A may specify the discharge timing Tpo from the detection result inputted from the sensor 430 (step S152).

Next, the laser controller 220A may calculate a delay time D of the discharge timing Tpo relative to the oscillation timing Tmo (step S153). Next, the laser controller 220A may calculate an error Δpp of the delay time D relative to a delay time D0 that has been set as a reference (step S154). The laser controller 220A may then correct the switch delay time Dpp (or the oscillation delay time Ddp) using the calculated error Δpp (step S155). Thereafter, the laser controller 220A may advance the process to step S109 of FIG. 8.

Figure 13:
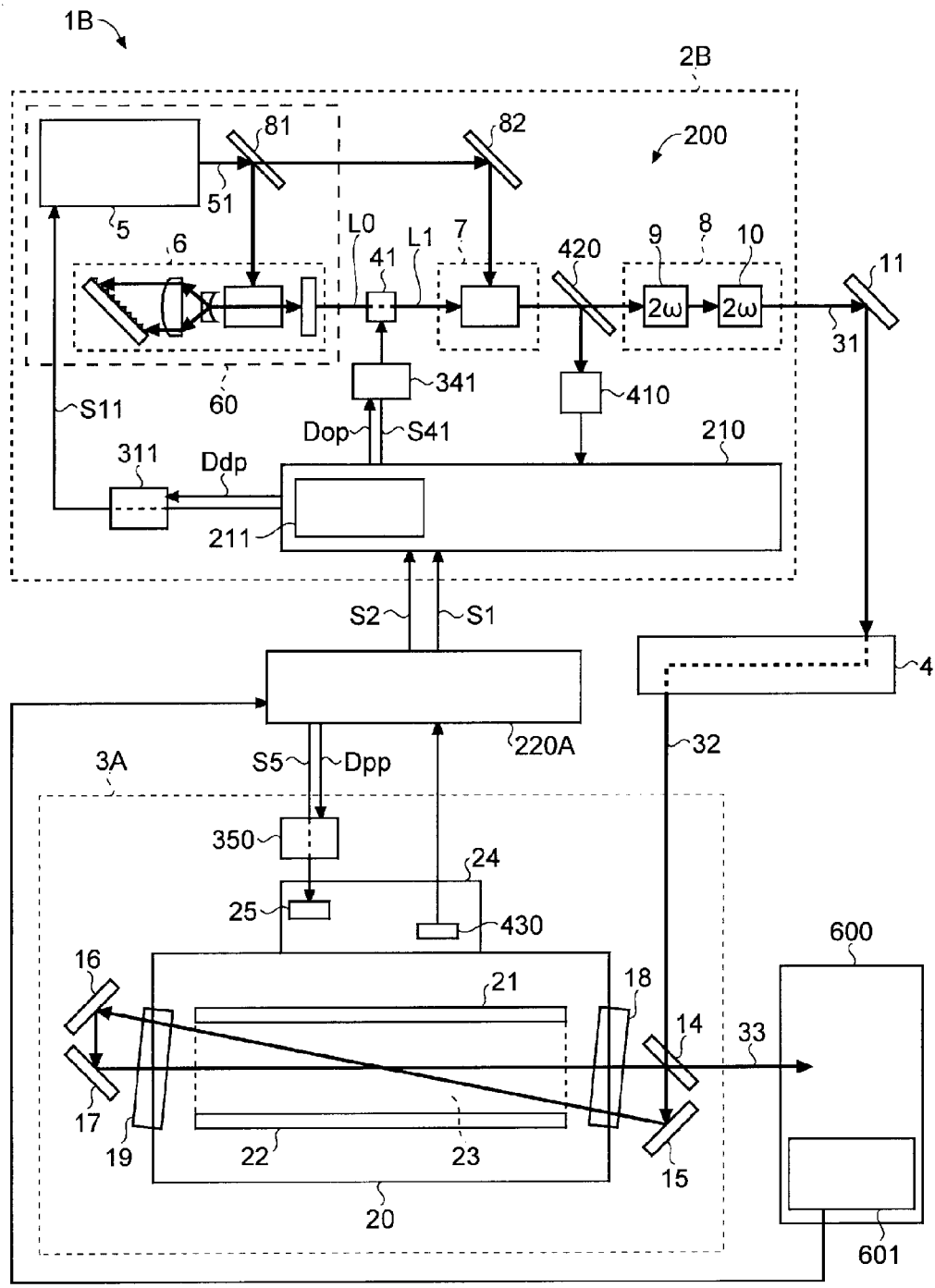
FIG. 13 illustrates the general configuration of a laser system according to a third embodiment of the present disclosure.

5. Laser System Performing Feedback Control on Synchronization of Master Oscillator Including Optical Shutter and Amplification Device Third Embodiment Next, a laser system 1B according to a third embodiment will be described in detail with reference to the drawings.
5.1 Configuration FIG. 13 illustrates the general configuration of the laser system 1B according to the third embodiment. As shown in FIG. 13, the laser system 1B may have a similar configuration to the laser system 1A shown in FIG. 2. However, in the laser system 1B, the master oscillator 2A provided in the laser system 1A is replaced with a master oscillator 2B.

The master oscillator 2B may further include an optical shutter 41 and a shutter delay circuit 341, in addition to the same constituent elements as those in the master oscillator 2A. Meanwhile, the pumping laser 5, the Ti:sapphire laser 6, and the beam splitter 81 in the solid-state laser device 200 may configure a long-pulse master oscillator 60.

An optical shutter operation signal S41 that controls the opening/closing operations of the optical shutter 41 may be inputted into the optical shutter 41 from the controller 210 via the shutter delay circuit 341. A shutter delay time Dop may be set in the shutter delay circuit 341 by the laser controller 220A via the controller 210. The optical shutter operation signal S41 may be inputted into the optical shutter 41 having been delayed by an amount equivalent to the shutter delay time Dop by passing through the shutter delay circuit 341.

Figure 14:
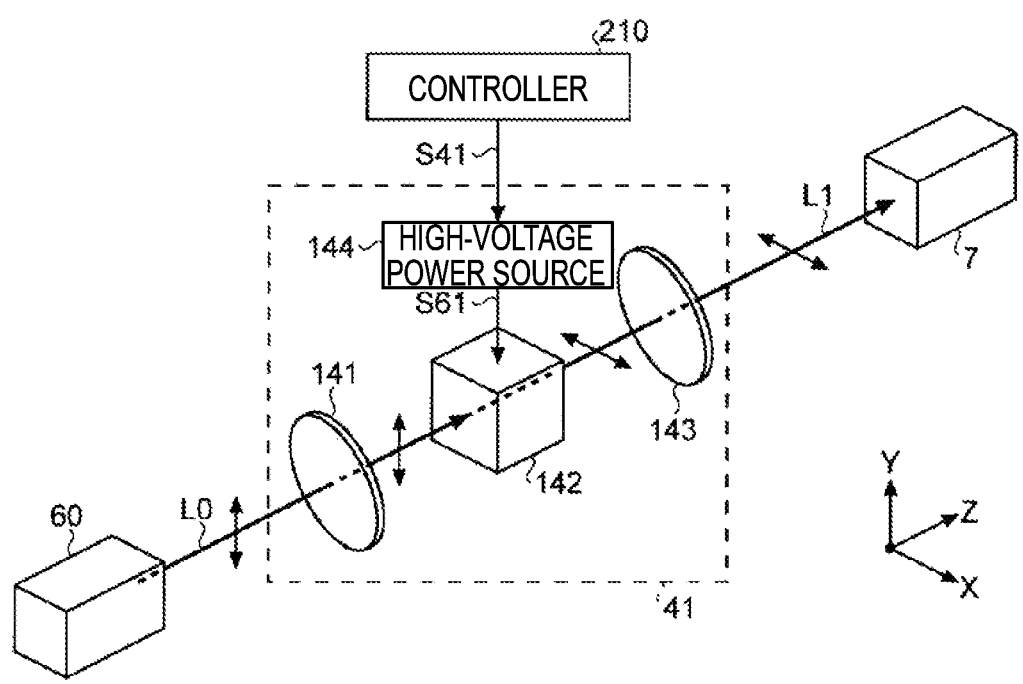
FIG. 14 illustrates an example of an optical shutter according to the third embodiment.

Other configurations are the same as those of the laser system 1A shown in FIG. 2.
5.1.1 Optical Shutter Here, FIG. 14 illustrates an example of an optical shutter according to the third embodiment. As shown in FIG. 14, the optical shutter 41 may include, for example, two polarizers 141 and 143, a Pockels cell 142, and a high-voltage power source 144. The polarizer 141 may, for example, allow a Y-direction polarized component of light that has entered to pass and block an X-direction polarized component of light that has entered. On the other hand, the polarizer 143 may, for example, allow an X-direction polarized component of light that has entered to pass and block a Y-direction polarized component of light that has entered. In this manner, the polarizer 141 and the polarizer 143 may allow different polarized components of the light to pass therethrough. For example, the polarization direction of the light allowed to pass therethrough may differ by approximately 90° between the polarizer 141 and the polarizer 143, as in this example.

The optical shutter operation signal S41 may be inputted into the high-voltage power source 144 of the optical shutter 41. When the optical shutter operation signal S41 is inputted to the high-voltage power source 144, the high-voltage power source 144 may apply a voltage S61 to the Pockels cell 142. The voltage S61 may have a pulse duration (time length) that is essentially the same as the pulse duration of the optical shutter operation signal S41. The Pockels cell 142 can, for example, change the polarization direction of inputted light during the period in which the voltage S61 is being applied. In this example, the voltage S61 having a voltage value that changes the polarization direction of the inputted light by approximately 90° may be applied to the Pockels cell 142 from the high-voltage power source 144.

Pulsed laser light L0 that enters the optical shutter 41 from the long-pulse master oscillator 60 may first enter the polarizer 141. The polarizer 141 may allow the Y-direction linearly-polarized component of the inputted pulsed laser light L0 (called "Y linearly-polarized pulsed laser light" hereinafter) to pass therethrough. The Y linearly-polarized pulsed laser light that has passed through the polarizer 141 enters the Pockels cell 142.

In the case where the voltage S61 is not being applied to the Pockels cell 142, the Y linearly-polarized pulsed laser light that has entered the Pockels cell 142 can be outputted from the Pockels cell 142 as-is, as Y-direction linearly-polarized light, and can enter the polarizer 143. Accordingly, the Y linearly-polarized pulsed laser light that has passed through the Pockels cell 142 can be reflected and absorbed by the polarizer 143. As a result, the pulsed laser light L0 can be blocked by the optical shutter 41.

On the other hand, in the case where the voltage S61 is being applied to the Pockels cell 142, the polarization direction of the Y linearly-polarized pulsed laser light that has entered the Pockels cell 142 can be changed by approximately 90°. As a result, X-direction linearly-polarized pulsed laser light (called "X linearly-polarized pulsed laser light" hereinafter) can be outputted from the Pockels cell 142. This X linearly-polarized pulsed laser light passes through the polarizer 143. As a result, pulsed laser light L1 is outputted from the optical shutter 41.

Figure 15:
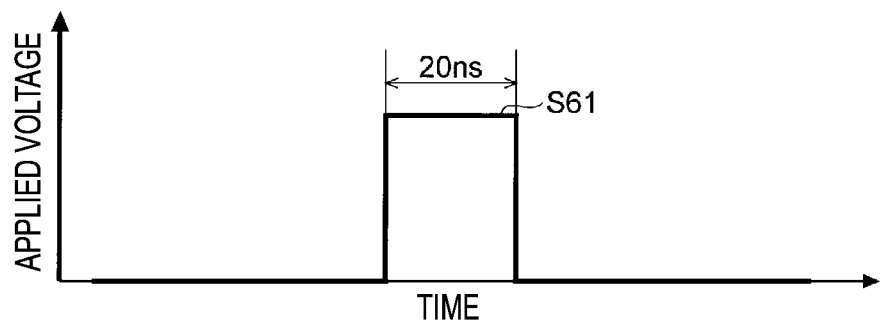
FIG. 15 illustrates an example of a high-voltage pulse applied to a Pockels cell according to the third embodiment.
Figure 16:
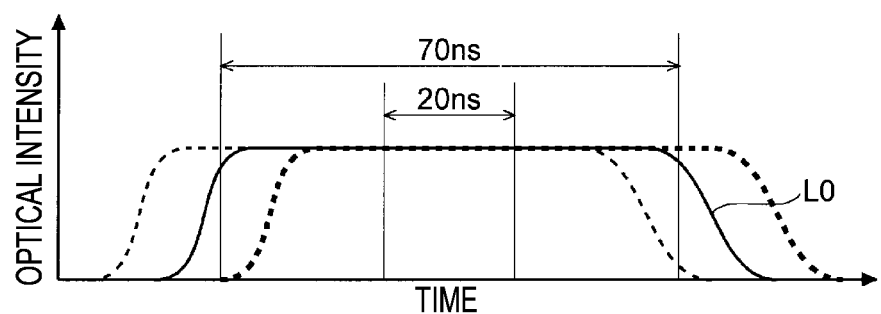
FIG. 16 illustrates an example of pulsed laser light outputted from a long-pulse master oscillator according to the third embodiment.
Figure 17:
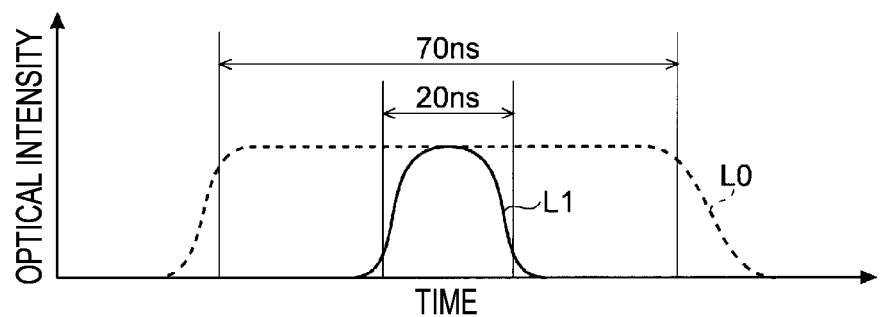
FIG. 17 illustrates an example of the pulsed laser light that has passed through the optical shutter according to the third embodiment.

In addition, assuming that, for example, the required pulse duration (time length) for the pulsed laser light L1 is approximately 20 ns, it is preferable, for example, for the voltage S61 having a pulse duration (time length) of approximately 20 ns to be applied to the Pockels cell 142, as shown in FIG. 15. Meanwhile, as described above, pulsed laser light having, for example, a pulse duration (time length) that is sufficiently greater than the jitter of the rise timing may be outputted from the long-pulse master oscillator 60. Assume, for example, that the jitter of the rise timing is approximately ±10 ns, and that the required pulse duration (time length) for the pulsed laser light L1 is approximately 20 ns. In this case, as shown in FIG. 16, it is preferable for the long-pulse master oscillator 60 to output, for example, the pulsed laser light L0 having a pulse duration (time length) of approximately 70 ns. Through this, as shown in FIG. 17, the pulsed laser light L1 having a pulse duration of approximately 20 ns may be outputted from the optical shutter 41, at a timing that is not affected by the jitter in the rise timing of the pulsed laser light L0. Note that a typical Pockels cell has a responsiveness of several ns, and thus is suitable in optical shutters for laser systems in which high-speed switching is demanded.

Note that the present example is a configuration in which the polarization directions of the pulsed laser light L0 that has passed through the polarizer 141 and the pulsed laser light L1 that has passed through the polarizer 143 have been changed to differ from each other by approximately 90°. For this reason, the optical shutter 41 is said to be in an open state during the period in which the voltage S61 is applied to the Pockels cell 142. However, the disclosure is not limited to this example. For example, the polarization directions of the pulsed laser light L0 that has passed through the polarizer 141 and the pulsed laser light L1 that has passed through the polarizer 143 may be the same direction. In this case, the optical shutter 41 is said to be in an open state during the period in which a voltage is not applied to the Pockels cell 142. Note that an optical shutter being in an "open state" refers to putting the optical shutter in a state in which pulsed laser light can pass therethrough, whereas an optical shutter being in a "closed state" refers to putting the optical shutter in a state in which pulsed laser light is blocked thereby.

5.2 Operations

Next, an overview of the operations performed by the laser system 1B will be given. The overall operations of the laser system 1B may be similar to those of the laser system 1A shown in FIG. 2. However, with the laser system 1B, the optical shutter operation signal S41 may be inputted into the optical shutter 41 from the controller 210. The optical shutter operation signal S41 may be inputted into the optical shutter 41 via the shutter delay circuit 341. Through this, the optical shutter 41 may open/close so that part of the pulsed laser light L0 outputted from the long-pulse master oscillator 60 is cut out.

Other operations are the same as those of the laser system 1A shown in FIG. 2.

5.3 Effects

By employing the configuration and operations as described above, in the third embodiment, the laser controller 220A may detect a difference between the timing of the pulsed laser light L1 cut out by the optical shutter 41 (for example, the oscillation timing Tmo) and the timing of a discharge (for example, the discharge timing Tpo). In accordance with that difference, the laser controller 220A may carry out feedback control on an opening/closing timing Top of the optical shutter 41 and the discharge timing Tpo of the amplification device 3A. Through this, a discharge can be caused to occur in the discharge space 23 in correspondence with the timing at which the pulsed laser light 32 passes through the discharge space 23 within the amplification device 3A. As a result, the pulsed laser light 32 can be amplified in a more stable manner without being influenced by drift in the opening/closing timing Top and the discharge timing Tpo.

In addition, in the third embodiment, the pulsed laser light L1 outputted from the optical shutter 41 may be caused to take on a pulse shape cut out from the pulsed laser light L0 based on the optical shutter operation signal S41 supplied to the optical shutter 41. In this manner, the pulsed laser light L1 may be controlled by the optical shutter operation signal S41 supplied to the optical shutter 41. For this reason, it is thought that jitter in the pulsed laser light L1 will become circuit jitter in the high-voltage power source 144 that applies the voltage S61 to the Pockels cell 142. It is furthermore thought that such circuit jitter is sufficiently short relative to the jitter of the pulsed laser light L0 outputted from the long-pulse master oscillator 60. Therefore, it is thought that the jitter in the pulsed laser light L1 that has passed through the optical shutter 41 is low enough to be ignored.

The master oscillator 2B can control the pulse duration using the optical shutter 41. Accordingly, it is also possible to change the pulse duration with ease.

5.4 Flowchart

Next, operations performed by the laser system 1B illustrated in FIG. 13 will be described in detail with reference to the drawings. However, because the general operations of the laser system 1B as a whole are the same as the operations illustrated in FIG. 8, the descriptions of those operations will be repeated here.

Figure 18:
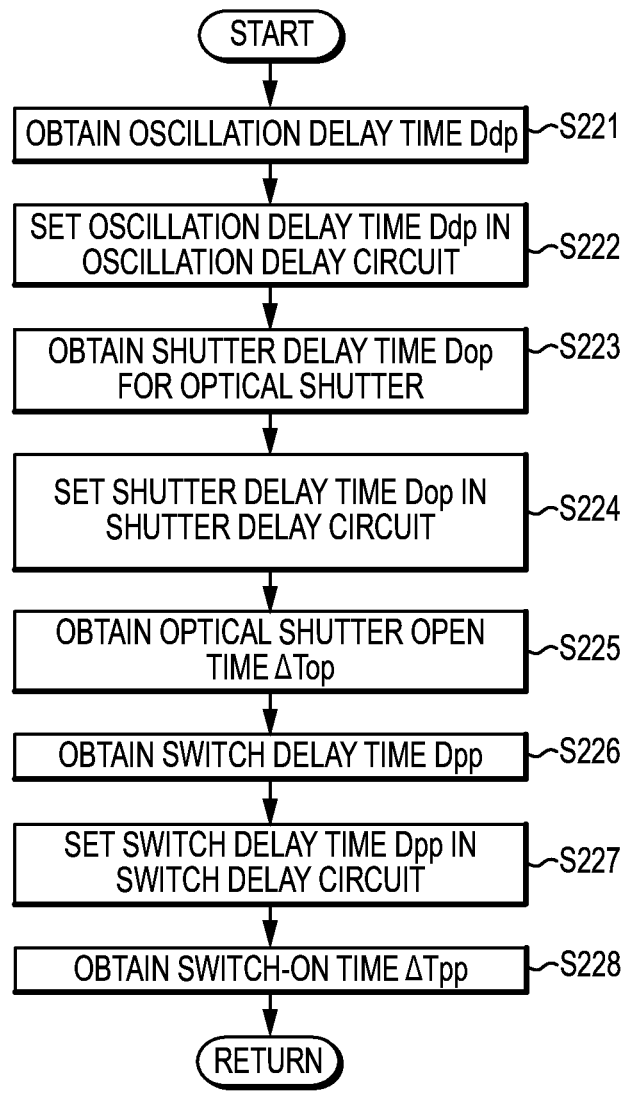
FIG. 18 is a flowchart illustrating an overview of the operations in a parameter initializing routine, indicated in step S101 of FIG. 8, according to the third embodiment.

FIG. 18 illustrates an overview of the operations in the parameter initializing routine indicated in step S101 of FIG. 8. As shown in FIG. 18, in the parameter initializing routine according to the third embodiment, the laser controller 220A may obtain the oscillation delay time Ddp set in the oscillation delay circuit 311 (step S221). The obtained oscillation delay time Ddp may be a default value stored in advance in a memory or the like (not shown), or may be a value newly calculated by the laser controller 220A. Continuing on, the laser controller 220A may set the obtained oscillation delay time Ddp in the oscillation delay circuit 311 via the controller 210 (step S222). Through this, the timing of the pumping laser oscillation signal S11 that passes through the oscillation delay circuit 311 may be delayed by an amount equivalent to the oscillation delay time Ddp.

Next, the laser controller 220A may obtain the shutter delay time Dop set in the shutter delay circuit 341 (step S223). The obtained shutter delay time Dop may be a default value stored in advance in a memory or the like (not shown), or may be a value newly calculated by the laser controller 220A. Next, the laser controller 220A may set the obtained shutter delay time Dop in the shutter delay circuit 341 via the controller 210 (step S224). Through this, the timing of the optical shutter operation signal S41 that passes through the shutter delay circuit 341 may be delayed by an amount equivalent to the shutter delay time Dop.

Next, the laser controller 220A may obtain a time for which to put the optical shutter 41 into the open state, or in other words, a cutout time of the pulsed laser light L1 (an optical shutter open time ΔTop) (step S225). The obtained optical shutter open time ΔTop may be a default value stored in advance in a memory or the like (not shown), or may be a value newly calculated by the laser controller 220A.

Next, the laser controller 220A may obtain the switch delay time Dpp set in the switch delay circuit 350 (step S226). The obtained switch delay time Dpp may be a default value stored in advance in a memory or the like (not shown), or may be a value newly calculated by the laser controller 220A. Then, the laser controller 220A may set the obtained switch delay time Dpp in the switch delay circuit 350 (step S227). Through this, the timing of the switch signal S5 that passes through the switch delay circuit 350 may be delayed by an amount equivalent to the switch delay time Dpp.

Next, the laser controller 220A may obtain a time to turn the switch 25 on, or in other words, a time for which to apply a discharge voltage between the anode 21 and the cathode 22 (that is, the switch-on time ΔTpp) (step S228). The obtained switch-on time ΔTpp may be a default value stored in advance in a memory or the like (not shown), or may be a value newly calculated by the laser controller 220A. Thereafter, the laser controller 220A may return to the operations indicated in FIG. 8.

Figure 19:
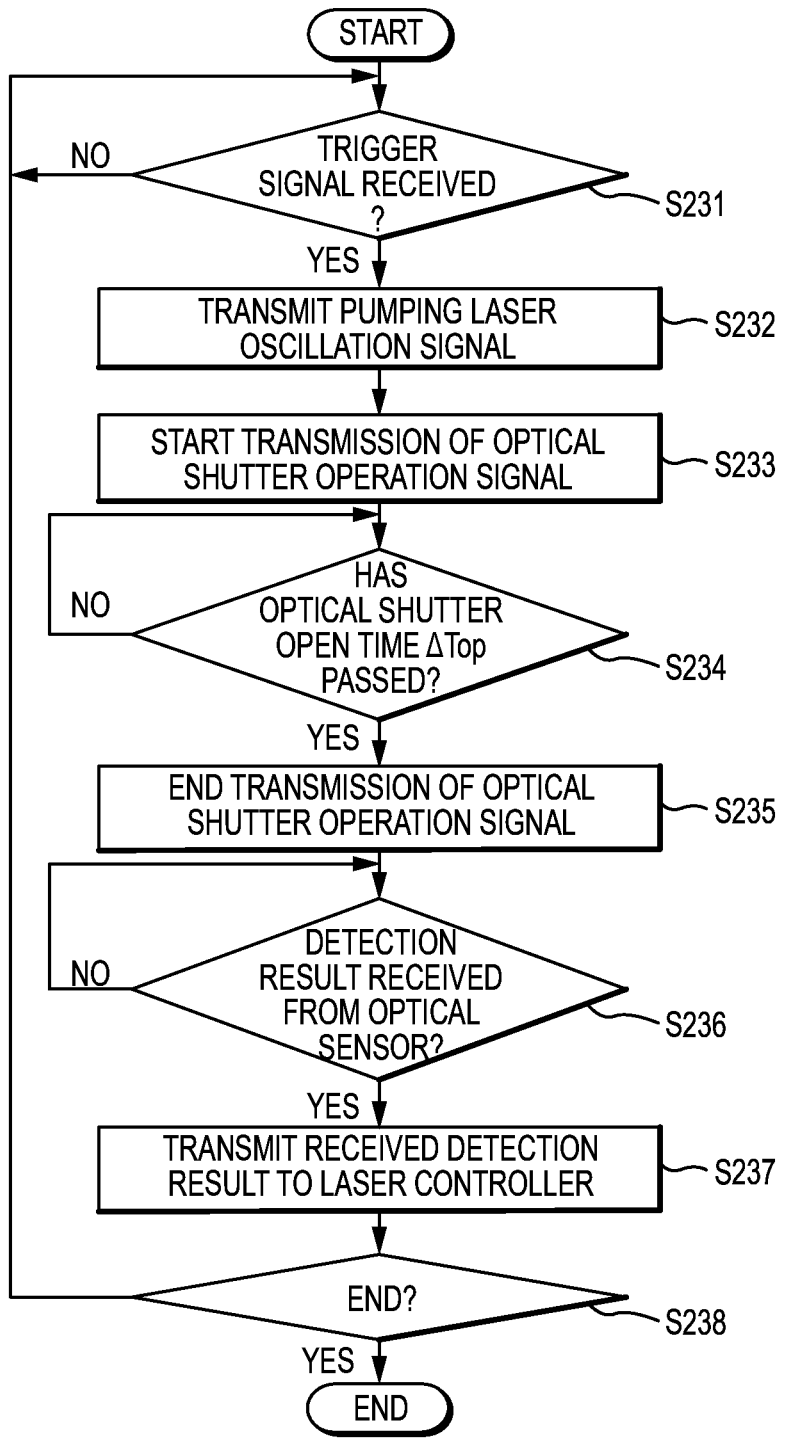
FIG. 19 is a flowchart illustrating the operations started by a controller in step S103 of FIG. 8, according to the third embodiment.

Operations started by the controller 210 in step S103 of FIG. 8 will now be described. As shown in FIG. 19, under the control of the laser controller 220A, the controller 210 may stand by until, for example, the trigger signal S1 is received from the laser controller 220A (step S231; NO). Note that the controller 210 may transmit the internal trigger oscillated by the internal trigger oscillator 211 at a predetermined repetition rate to the pumping laser 5 as the pumping laser oscillation signal S11 during the period in which the trigger signal S1 is not being inputted from the laser controller 220A at an approximately predetermined repetition rate.

When the trigger signal S1 has been received (step S231; YES), the controller 210 may transmit the pumping laser oscillation signal S11 to the pumping laser 5 (step S232). Furthermore, the controller 210 may also start transmitting the optical shutter operation signal S41 to the optical shutter 41 (step S233). The pumping laser oscillation signal S11 may be inputted to the pumping laser 5 through the oscillation delay circuit 311. The optical shutter operation signal S41 may be inputted to the optical shutter 41 through the shutter delay circuit 341. The oscillation delay circuit 311 may be set so as to delay the pumping laser oscillation signal S11 by an amount equivalent to the oscillation delay time Ddp. The shutter delay time Dop may be set in the shutter delay circuit 341 so that the optical shutter 41 carries out opening/closing operations in correspondence with the timing at which the pulsed laser light passes therethrough. Through this, the timing at which the pumping light 51 is outputted from the pumping laser 5 and the timing at which the optical shutter 41 opens and closes may be adjusted. Note that the timing at which the pumping light 51 is outputted from the pumping laser 5 may be directly related to the timing at which the pulsed laser light L0 is outputted from the long-pulse master oscillator 60.

Thereafter, the controller 210 may measure the time that has elapsed after the start of the transmission of the respective optical shutter operation signal S41 using, for example, a timer or the like (not shown). The controller 210 may then stand by until this measured time has become greater than or equal to the pre-set optical shutter open time ΔTop (step S234; NO).

When the optical shutter open time ΔTop has elapsed (step S234; YES), the controller 210 may end the transmission of the optical shutter operation signal S41 (step S235). Through this, the optical shutter 41 may enter the closed state. Note that as described above, using the long-pulse master oscillator 60 may make it possible to adjust the waveform of the pulsed laser light L1, using the opening/closing operations of the optical shutter 41.

Next, the controller 210 may stand by until the result of detecting the pulsed laser light L1 is inputted from the optical sensor 410 (step S236; NO). When the detection result is inputted from the optical sensor 410 (step S236; YES), the controller 210 may transmit the inputted detection result to the laser controller 220A (step S237). After this, the controller 210 may determine whether or not an end to the operations has been specified by the laser controller 220A or the like (step S238). In the case where the end has been specified (step S238; YES), the controller 210 may end the present operations. However, in the case where the end has not been specified (step S238; NO), the controller 210 may return to step S231.

Figure 20:
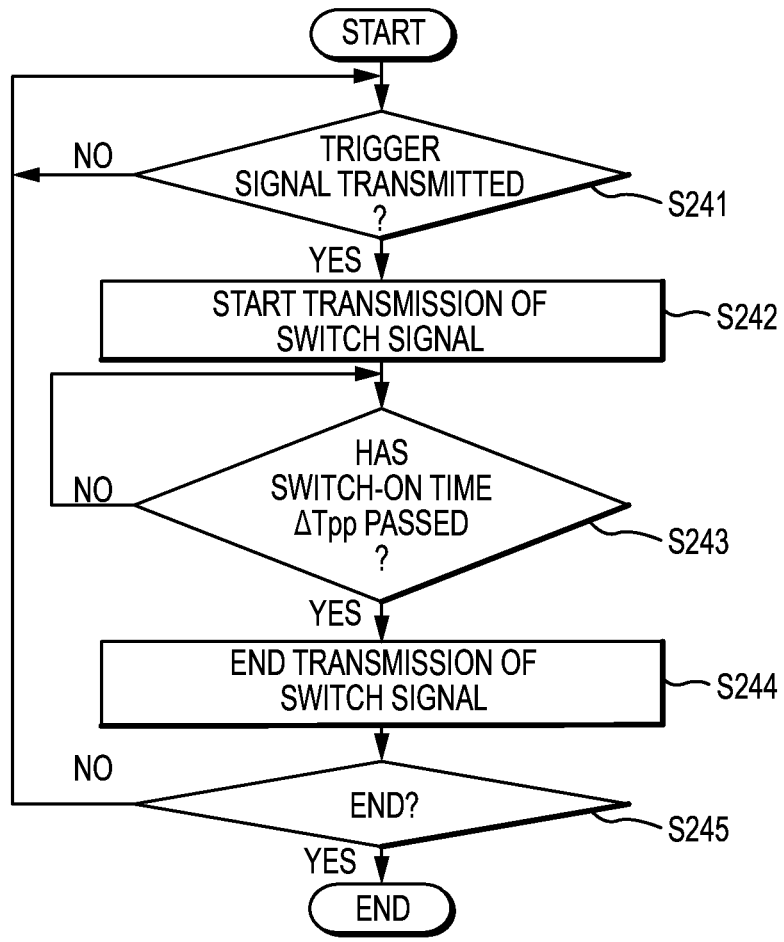
FIG. 20 is a flowchart illustrating the operations started by a laser controller in step S104 of FIG. 8, according to the third embodiment.

Next, operations started by the laser controller 220A in step S104 of FIG. 8 will be described. As shown in FIG. 20, the laser controller 220A may stand by until the trigger signal S1 is outputted to the controller 210 at an approximately predetermined repetition rate (step S241; NO). When the trigger signal S1 is outputted (step S241; YES), the laser controller 220A may start the transmission of the switch signal S5 to the switch 25 (step S242). The switch signal S5 may be inputted to the switch 25 through the switch delay circuit 350. The switch delay time Dpp may be set in the switch delay circuit 350 so that a discharge occurs in the discharge space 23 in correspondence with the timing at which the pulsed laser light 32 passes through the discharge space 23.

Thereafter, the laser controller 220A may measure the time that has elapsed after the start of the transmission of the switch signal S5 using, for example, a timer or the like (not shown). The laser controller 220A may then stand by until the measured time becomes greater than or equal to the pre-set switch-on time $\Delta$Tpp (step S243; NO).

When the switch-on time $\Delta$Tpp has elapsed (step S243; YES), the laser controller 220A may end the transmission of the switch signal S5 (step S244). Through this, the period in which a discharge occurs in the discharge space 23 may be adjusted. Thereafter, the laser controller 220A may determine whether or not to end the operations (step S245). In the case where the operations are to be ended (step S245; YES), the laser controller 220A may end the present operations. However, in the case where the operations are not to be ended (step S245; NO), the laser controller 220A may return to step S241.

Figure 21:
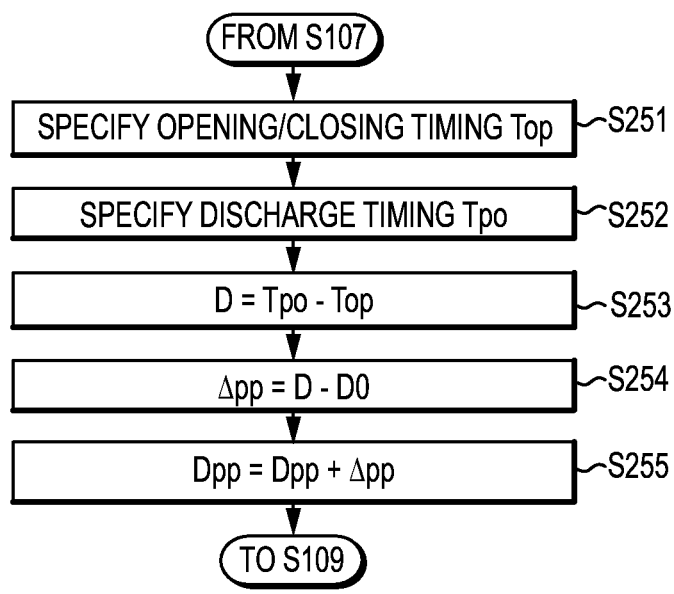
FIG. 21 is a flowchart illustrating details of step S108 of FIG. 8 according to the third embodiment.

Next, step S108 of FIG. 8 will be described in detail. As shown in FIG. 21, the laser controller 220A may specify the opening/closing timing Top based on the result of the detection performed by the optical sensor 410 that has been inputted from the controller 210 (step S251). In addition, the laser controller 220A may specify the discharge timing Tpo from the detection result inputted from the sensor 430 (step S252).

Next, the laser controller 220A may calculate the delay time D of the discharge timing Tpo relative to the opening/closing timing Top (step S253). Next, the laser controller 220A may calculate the error $\Delta$pp of the delay time D relative to the delay time D0 that has been set as a reference (step S254). The laser controller 220A may then correct the switch delay time Dpp (or the oscillation delay time Ddp and the shutter delay time Dop) using the calculated error $\Delta$pp (step S255). Thereafter, the laser controller 220A may advance the process to step S109 of FIG. 8.

6. Additional Descriptions

Next, additional descriptions of the various portions described in the aforementioned embodiments will be given.

6.1 Ti:Sapphire Laser

Figure 22:
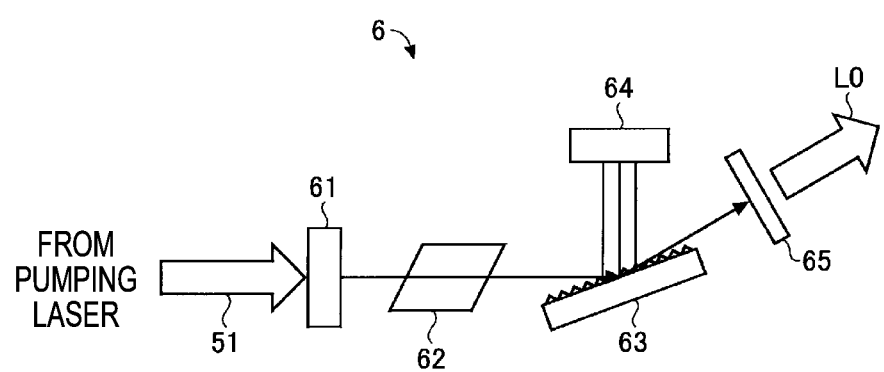
FIG. 22 illustrates an example of a Ti: sapphire laser according to the first through third embodiments.

FIG. 22 illustrates an example of the aforementioned Ti:sapphire laser 6. As shown in FIG. 22, the Ti:sapphire laser 6 may be what is known as a Littman-type laser. The Ti:sapphire laser 6 includes a high-reflection mirror 61, an output coupling mirror 65, a Ti:sapphire crystal 62, a grating 63, and a high-reflection mirror 64. The high-reflection mirror 61 and the output coupling mirror 65 form an optical resonator. The Ti:sapphire crystal 62 and the grating 63 are disposed in the optical path of this optical resonator. The high-reflection mirror 64 reflects laser light diffracted by the grating 63 to return back toward the grating 63. The high-reflection mirrors 61 and 64 form a resonator that is separate from the resonator formed by the high-reflection mirror 61 and the output coupling mirror 65. The output coupling mirror 65, meanwhile, also functions as an optical output terminal for outputting the pulsed laser light L0.

The high-reflection mirror 61 allows the pumping light 51 from the pumping laser 5 to pass therethrough and reflects the pulsed laser light from the Ti:sapphire crystal 62 thereby. The pumping light 51 inputted via the high-reflection mirror 61 enters the Ti:sapphire crystal 62. The optical input/output terminal surfaces of the Ti:sapphire crystal 62 are cut to a Brewster's angle. Through this, the reflection of laser light at these terminal surfaces is suppressed. The Ti:sapphire crystal 62 which the pumping light 51 has entered outputs the pulsed laser light L0 through oscillation using the energy obtained from the pumping light 51 that travels back and forth within the resonator. The pulsed laser light L0 emitted from the Ti:sapphire crystal 62 is diffracted by the grating 63. Here, the output coupling mirror 65 is disposed relative to the grating 63 in, for example, the emission direction of zero-order diffracted light. In addition, the high-reflection mirror 64 is disposed relative to the grating 63 in the emission direction of $\pm$m-order diffracted light. According to this configuration, by adjusting the angle of the high-reflection mirror 64 relative to the grating 63, the wavelength of the pulsed laser light L0 outputted by the Ti:sapphire laser 6 can be selected. As a result, it is possible to control the spectral linewidth of the pulsed laser light L0 outputted by the Ti:sapphire laser 6 to a spectral linewidth whose chromatic aberration can be ignored at the time of exposure.

6.2 Amplifier (PA)

Figure 23:
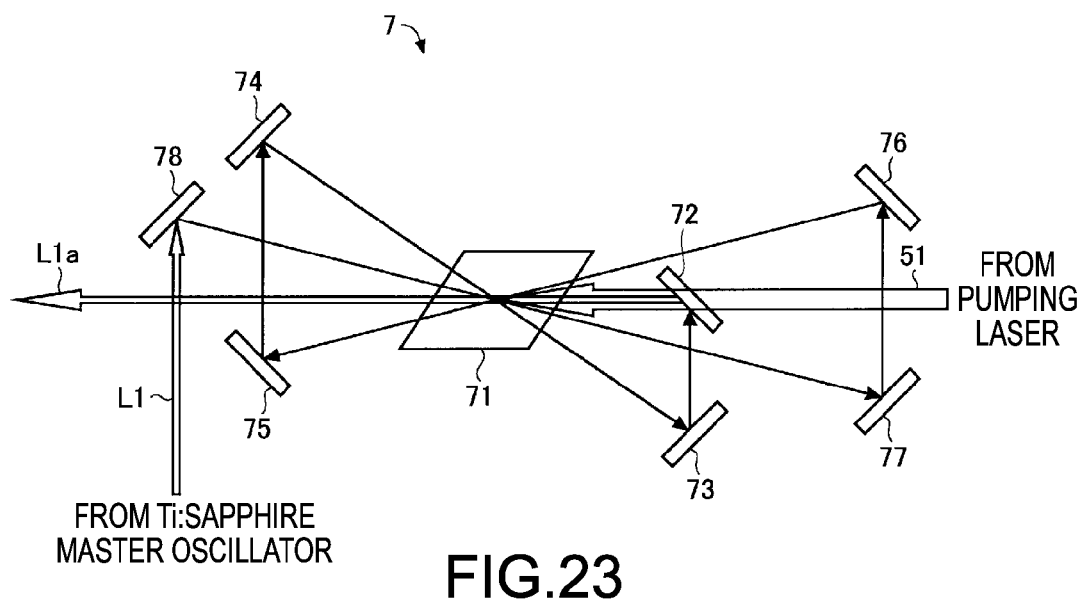
FIG. 23 illustrates an example of an amplifier according to the first through third embodiments.

FIG. 23 is a diagram illustrating an example of the aforementioned amplifier 7. Note that in this example, a multipass amplification-type power amplifier that does not include an optical resonator is given as an example. As shown in FIG. 23, the amplifier 7 includes a plurality of high-reflection mirrors 72 through 78 and a Ti:sapphire crystal 71. The plurality of high-reflection mirrors 72 through 78 forms multiple passes so that the pulsed laser light L1 inputted from the Ti:sapphire laser 6 through the optical shutter 41 passes through the Ti:sapphire crystal 71 a plurality of times (in the present example, four times). The pumping light 51 from the pumping laser 5 enters the Ti:sapphire crystal 71 through the high-reflection mirror 72. The optical input/output terminal surfaces of the Ti:sapphire crystal 71 are cut to a Brewster's angle. The Ti:sapphire crystal 71 oscillates while obtaining energy from the pumping light 51 based on the pulsed laser light L1 that advances through the multiple passes. Through this, the pulsed laser light L1 undergoes multipass amplification with each of the plurality of passes. As a result, pulsed laser light L1a that has been amplified is emitted from the amplifier 7. Note that the high-reflection mirror 72 allows the pumping light 51 to pass but reflects the laser light from the Ti:sapphire crystal 71.

6.3 Amplifier Including Optical Resonator (PO)

Figure 24:
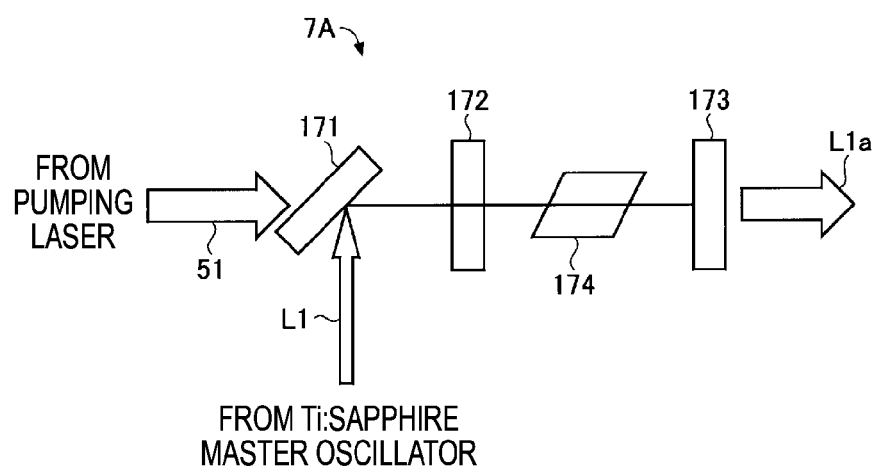
FIG. 24 illustrates the general configuration of a Fabry-Perot amplifier according to the first through third embodiments.

It is also possible to replace the amplifier 7 with a power oscillator that includes an optical resonator therein. FIG. 24 illustrates the general configuration of a Fabry Perot-type amplifier 7A. As shown in FIG. 24, the amplifier 7A includes a high-reflection mirror 172, an output coupling mirror 173, a Ti:sapphire crystal 174, and a high-reflection mirror 171. The high-reflection mirror 172 and the output coupling mirror 173 form an optical resonator. The Ti:sapphire crystal 174 is disposed in the optical path in this optical resonator. The high-reflection mirror 171 leads the pulsed laser light L1 inputted from the Ti:sapphire laser 6 through the optical shutter 41 and the pumping light 51 from the pumping laser 5 into the optical resonator.

The high-reflection mirror 171 reflects the pulsed laser light L1 from the Ti:sapphire laser 6 toward the optical resonator, and allows the pumping light 51 from the pumping laser 5 to pass toward the optical resonator. In addition, the high-reflection mirror 172 of the two that form the optical resonator allows the pulsed laser light L1 and the pumping light 51 to pass and reflects laser light from the Ti:sapphire crystal 174. The optical input/output terminal surfaces of the Ti:sapphire crystal 174 are cut to a Brewster's angle. Through this, the reflection of laser light at these terminal surfaces is suppressed. By oscillating while obtaining energy from the pumping light 51 based on the pulsed laser light L1 that travels back and forth within the optical resonator, the Ti:sapphire crystal 174 emits the amplified pulsed laser light L1a. The pulsed laser light L1a that has been amplified is outputted via the output coupling mirror 173.

The aforementioned descriptions are intended to be taken only as examples, and are not to be seen as limiting in any way. Accordingly, it will be clear to those skilled in the art that variations on the embodiments of the present disclosure can be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the indefinite article "a" or "an" as used in the present specification and the scope of the appended claims should be interpreted as meaning "at least one" or "one or more."

Although the aforementioned embodiment describes an example in which there is one amplifier 7, a plurality of amplifiers 7 may be used. Furthermore, although the Ti:sapphire laser 6 and the amplifier 7 are pumped by a shared pumping laser 5, separate pumping lasers may be used. In addition, a laser that oscillates second harmonic light of an Nd:YLF laser or an Nd:YVO$_4$ laser may be used as the pumping laser 5. In addition, a laser that emits second harmonic light of an erbium-doped fiber-optic laser may be used in place of the Ti:sapphire laser 6. This laser may be pumped using a semiconductor laser. Furthermore, the wavelength conversion unit 8 is not limited to the configuration described in the present disclosure, and any configuration may be employed as long as the light entering the wavelength conversion unit 8 is converted into light having a wavelength in the gain bandwidth of the amplification device 3, such as, for example, a wavelength of approximately 193 nm. For example, a CLBO crystal may be used instead of the LBO crystal 9 as the wavelength conversion element included in the wavelength conversion unit 8.

What is claimed is:

1. A laser system comprising:
   a master oscillator configured to generate pulsed laser light;
   an amplification device configured to amplify the pulsed laser light from the master oscillator;
   a first timing detector configured to detect a first timing at which the pulsed laser light passes through a predetermined position;
   a second timing detector configured to detect a second timing at which the amplification device discharges; and
   a controller configured to, based on results of detection by the first timing detector and the second timing detector, control at least one of the first timing and the second timing so that the amplification device discharges when the pulsed laser light passes through a discharge space of the amplification device,
   wherein the master oscillator includes:
   a pumping laser configured to output pumping light;
   a seed laser configured to oscillate by irradiation with the pumping light; and
   an amplifier configured to amplify the pulsed laser light generated by the seed laser using the pumping light,
   wherein the controller is configured to control at least one of a timing at which the pumping laser oscillates and a timing at which the amplification device discharges based on the results of detection by the first timing detector and the second timing detector.

2. A laser system comprising:
   a master oscillator configured to generate pulsed laser light;
   an amplification device configured to amplify the pulsed laser light from the master oscillator;
   a first timing detector configured to detect a first timing at which the pulsed laser light passes through a predetermined position;
   a second timing detector configured to detect a second timing at which the amplification device discharges; and
   a controller configured to, based on results of detection by the first timing detector and the second timing detector, control at least one of the first timing and the second timing so that the amplification device discharges when the pulsed laser light passes through a discharge space of the amplification device,
   wherein the master oscillator includes:
   a pumping laser configured to output pumping light;
   a seed laser configured to oscillate by irradiation with the pumping light;
   an amplifier configured to amplify the pulsed laser light generated by the seed laser using the pumping light; and
   at least one optical shutter disposed in an optical path between the seed laser and the amplifier,
   wherein the predetermined position is a position where the pulsed laser light passes through after the optical shutter, and
   wherein the controller is configured to control at least one of a timing at which the optical shutter is put into an open state and a timing at which the amplification device discharges based on the results of detection by the first timing detector and the second timing detector.

3. A laser system comprising:
   a master oscillator configured to generate pulsed laser light;
   an amplification device configured to amplify the pulsed laser light from the master oscillator;
   a first timing detector configured to detect a first timing at which the pulsed laser light passes through a predetermined position;
   a second timing detector configured to detect a second timing at which the amplification device discharges; and
   a controller configured to, based on results of detection by the first timing detector and the second timing detector, control at least one of the first timing and the second timing so that the amplification device discharges when the pulsed laser light passes through a discharge space of the amplification device,
   wherein the amplification device includes a circuit having a magnetic switch for causing a discharge in the discharge space, and wherein the second timing detector is configured to detect turning on and off of the magnetic switch as the second timing.

4. The laser system according to claim 2, wherein the seed laser is configured to output the pulsed laser light having a pulse duration that is longer than the period for which the controller puts the optical shutter in the open state.

5. The laser system according to claim 2, wherein the optical shutter includes:
   an electro-optical element;
   a first optical filter disposed on an optical input end side of the electro-optical element;
   a second optical filter disposed on an optical output end side of the electro-optical element; and a power source connected to the electro-optical element, the power source being configured to apply a voltage to the electro-optical element.

6. The laser system according to claim 5, wherein the electro-optical element is a Pockels cell.

7. The laser system according to claim 5, wherein each of the first and second optical filters includes at least one polarizer.

\* \* \* \* \*